United States Patent
Chapuis et al.

(10) Patent No.: US 11,412,865 B2
(45) Date of Patent: Aug. 16, 2022

(54) APPARATUSES THAT SECURE WEARABLES TO DISPLAY TABLES AND OTHER DISPLAY SURFACES

(71) Applicant: OnQ Solutions, Inc., Hayward, CA (US)

(72) Inventors: Paul F. Chapuis, Woodside, CA (US); Steven D. Penny, Oakland, CA (US); Sean A. Naderzad, San Jose, CA (US)

(73) Assignee: OnQ Solutions, Inc., Hayward, CA (US)

( * ) Notice: Subject to any disclaimer, the term of this patent is extended or adjusted under 35 U.S.C. 154(b) by 352 days.

(21) Appl. No.: 16/842,419

(22) Filed: Apr. 7, 2020

(65) Prior Publication Data

US 2021/0307543 A1   Oct. 7, 2021

(51) Int. Cl.
| | | |
|---|---|---|
| *A47F 7/024* | (2006.01) | |
| *A47F 7/02* | (2006.01) | |
| *A47F 5/04* | (2006.01) | |
| *G08B 13/14* | (2006.01) | |
| *F16M 11/00* | (2006.01) | |
| *A47F 5/16* | (2006.01) | |
| *A47F 5/00* | (2006.01) | |

(52) U.S. Cl.
CPC ............... *A47F 7/022* (2013.01); *A47F 5/04* (2013.01); *A47F 7/024* (2013.01); *F16M 11/00* (2013.01); *G08B 13/14* (2013.01); *A47F 5/16* (2013.01); *A47F 2005/0075* (2013.01); *A47F 2005/165* (2013.01)

(58) Field of Classification Search
CPC .. A47F 7/022; A47F 5/04; A47F 7/024; A47F 5/16; A47F 2005/0075; A47F 2005/165; F16M 11/00; G08B 13/14
USPC ................................................. 248/116, 551
See application file for complete search history.

(56) References Cited

U.S. PATENT DOCUMENTS

| | | |
|---|---|---|
| 6,700,488 B1 | 3/2004 | Leyden et al. |
| 6,831,560 B2 | 12/2004 | Gresset |
| 7,187,283 B2 | 3/2007 | Leyden et al. |
| 8,191,851 B2 | 6/2012 | Crown |

(Continued)

OTHER PUBLICATIONS

Gripzo, "iPad Enclosure", https://www.gripzo.com/en/products/tablets/ipad-enclosure, downloaded on Jun. 11, 2018.

(Continued)

*Primary Examiner* — Kimberly T Wood
(74) *Attorney, Agent, or Firm* — Vierra Magen Marcus LLP

(57) ABSTRACT

Security apparatuses disclosed herein selectively secure a wearable device to a tabletop of a display table or to another display surface. The security apparatus comprises a neck, a support shelf, and a brace. The neck includes first and second neck portions configured to be selectively attached to and detached from one another. The support shelf includes first and second shelf portions, attached respectively, to upper ends of the first and second neck portions. The brace includes first and second brace elements configured to be selectively attached respectively to the first and second shelf portions, while the first and second neck portions are detached from one another. The brace is configured to encase at least a portion of a housing of a wearable device to thereby secure the wearable device to the support shelf.

18 Claims, 15 Drawing Sheets

(56) References Cited

U.S. PATENT DOCUMENTS

| | | | |
|---|---|---|---|
| 8,360,373 | B2 | 1/2013 | Johnson et al. |
| 8,701,452 | B2 | 4/2014 | Foster et al. |
| 8,814,128 | B2 | 8/2014 | Trinh et al. |
| 8,864,089 | B2 | 10/2014 | Hung |
| 8,925,886 | B2 | 1/2015 | Sears |
| 8,985,544 | B1* | 3/2015 | Gulick, Jr. .............. F16M 13/00 248/176.1 |
| 8,998,048 | B1 | 4/2015 | Wu |
| 9,022,337 | B2 | 5/2015 | Petruskavich |
| 9,039,785 | B2 | 5/2015 | Gulick, Jr. |
| 9,097,380 | B2 | 8/2015 | Wheeler |
| 9,159,309 | B2 | 10/2015 | Liu et al. |
| 9,161,466 | B2 | 10/2015 | Huang |
| 9,567,776 | B2 | 2/2017 | Moock et al. |
| 9,568,141 | B1 | 2/2017 | Zaloom |
| 9,714,528 | B2 | 7/2017 | Van Balen |
| 9,936,823 | B2 | 4/2018 | Galant |
| 10,165,873 | B2 | 1/2019 | Gulick, Jr. et al. |
| 10,323,440 | B1* | 6/2019 | Kelsch ............... G08B 13/2434 |
| 10,394,297 | B1 | 8/2019 | Han |
| 10,448,759 | B1* | 10/2019 | Chapuis .................... F16B 2/10 |
| 11,178,983 | B1* | 11/2021 | Kelsch .................... A47F 7/024 |
| 2008/0142665 | A1 | 6/2008 | Belden et al. |
| 2010/0079285 | A1 | 4/2010 | Fawcett et al. |
| 2010/0108828 | A1 | 5/2010 | Yu et al. |
| 2010/0148030 | A1 | 6/2010 | Lin |
| 2011/0068919 | A1 | 3/2011 | Rapp et al. |
| 2012/0037783 | A1 | 2/2012 | Alexander et al. |
| 2012/0234055 | A1 | 9/2012 | Bland, III et al. |
| 2013/0301216 | A1 | 11/2013 | Trinh et al. |
| 2013/0318639 | A1 | 11/2013 | Gulick, Jr. |
| 2014/0060218 | A1 | 3/2014 | Bisesti et al. |
| 2014/0226298 | A1 | 8/2014 | Palmer et al. |
| 2015/0089675 | A1 | 3/2015 | Gulick, Jr. |
| 2015/0108948 | A1 | 4/2015 | Gulick, Jr. et al. |
| 2015/0196140 | A1 | 7/2015 | Lin |
| 2015/0300050 | A1 | 10/2015 | Van Balen |
| 2016/0278544 | A1 | 9/2016 | Rubino et al. |
| 2017/0049251 | A1 | 2/2017 | Gulick, Jr. et al. |
| 2017/0188724 | A1 | 7/2017 | Lin |
| 2018/0058107 | A1 | 3/2018 | Lucas et al. |
| 2018/0279809 | A1 | 10/2018 | Regan et al. |
| 2018/0324974 | A1 | 11/2018 | Mills |
| 2018/0342136 | A1 | 11/2018 | Hartweg et al. |
| 2020/0008589 | A1 | 1/2020 | Chapuis et al. |
| 2020/0107653 | A1* | 4/2020 | Leyden .................... F16B 2/12 |
| 2020/0271266 | A1* | 8/2020 | Gulick, Jr. .......... E05B 73/0082 |
| 2021/0018137 | A1 | 1/2021 | Chapuis et al. |
| 2021/0059437 | A1* | 3/2021 | Chapuis ................. F16M 11/04 |
| 2021/0164603 | A1* | 6/2021 | Chapuis ................ A47F 7/0246 |

OTHER PUBLICATIONS

Gripzo, "iPhone", https://www.gripzo.com/en/products/smartphones/iphone, downloaded on Jun. 11, 2018.

Scorpion Security Products, "4-Point ERS Phone Scorpion", https://www.scorpionsecurityproducts.com/product/4-point-ers-phone-scorpion/, downloaded on Jun. 11, 2018.

Scorpion Security Products, "4-Point ERS Small Tablet Scorpion", https://www.scorpionsecurityproducts.com/product/4-point-ers-small-tablet-scorpion/, downloaded on Jun. 11, 2018.

Dongguan Comer Electronic Technology Co., Ltd., "Comer Anti-Theft Locking Laptop Mechanical Security Display Frame For Mobile Phone Stores", http://www.comerdisplay.com/sale-8024631-comer-anti-theft-locking-laptop-mechanical-security-display-frame-for-mobile-phone-stores.html, downloaded on Jun. 11, 2018.

Dongguan Comer Electronic Technology Co., Ltd., "Comer Universal Display Mechanical Anti-Theft Security Display Locking System For Tablet Brackets", http://www.smartcomer.com/sale-8028445-comer-universal-display-mechanical-anti-theft-security-display-locking-system-for-tablet-brackets.html, downloaded on Jun. 11, 2018.

RTF, "Vise—Securely And Attractively Placing Your Product First", http://www.rtfglobal.com/products/vise-cell-phone-security/, downloaded on Jun. 11, 2018.

RTF, "Smartphones—Samsung Note 3, LG Flex, HTC One, Apple iPhone 5, Blackberry Z10", http://www.rtfglobal.com/solutions/by-devices-type/smartphones/#!prettyPhoto, downloaded on Jun. 11, 2018.

Gripzo, "Universal Smartphone Grip/ Universal Tablet Grip", https://www.gripzo.com/en/products/smartphones/iphone, downloaded on Jun. 14, 2018.

InVue, "Wearables Solutions: Complete display security solutions for wearables," invue.com, Aug. 6, 2019, 4 pages.

MTI, "Freedom Micro FlexTech," Brochure, www.MTIGS.com, Oct. 2019, 3 pages.

Scorpion Security Products, "Smartwatch Scorpion: Apple Watch," Brochure, www.scorpionsp.com, Nov. 2019, 1 page.

Scorpion Security Products, "Smartwatch Scorpion: Garmin," Brochure, www.scorpionsp.com, Nov. 2019, 1 page.

Scorpion Security Products, "Smartwatch Scorpion: Gizmo," Brochure, www.scorpionsp.com, Nov. 2019, 1 page.

Scorpion Security Products, "Smartwatch Scorpion: Samsung Galaxy Active2," Brochure, www.scorpionsp.com, Nov. 2019, 1 page.

Scorpion Security Products, "Smartwatch Scorpion: Samsung," Brochure, www.scorpionsp.com, Nov. 2019, 1 page.

* cited by examiner

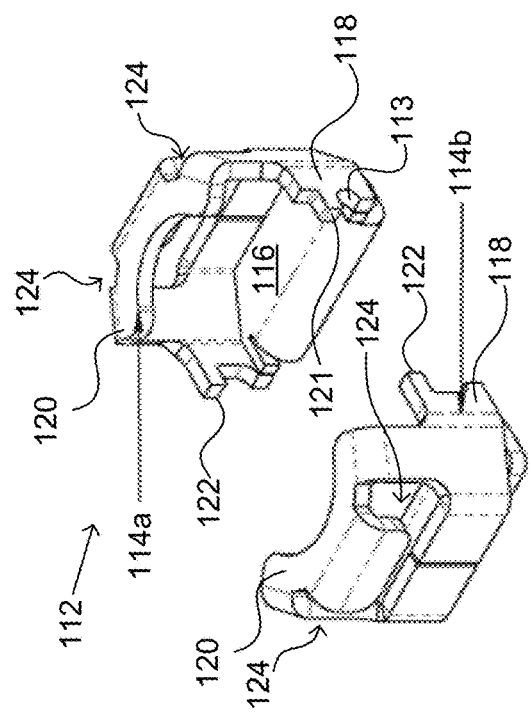
FIG. 13A
FIG. 13B
FIG. 13C
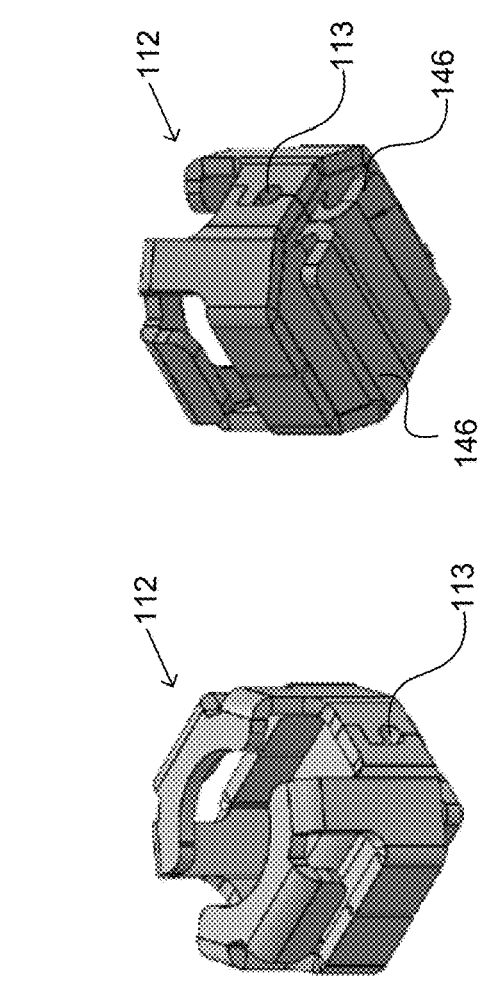
FIG. 13D
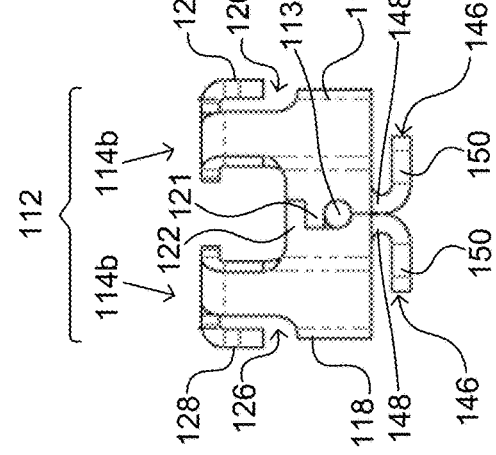
FIG. 13E
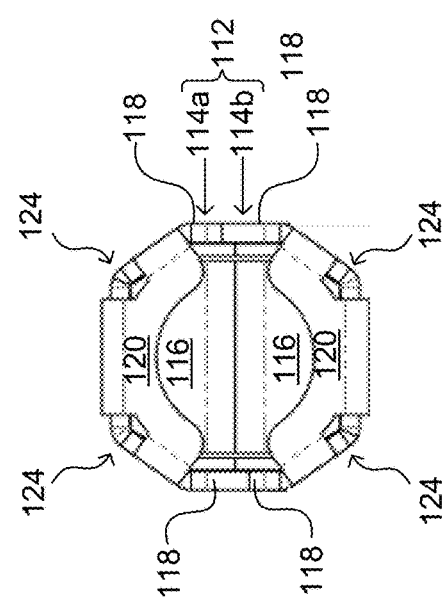
FIG. 13F

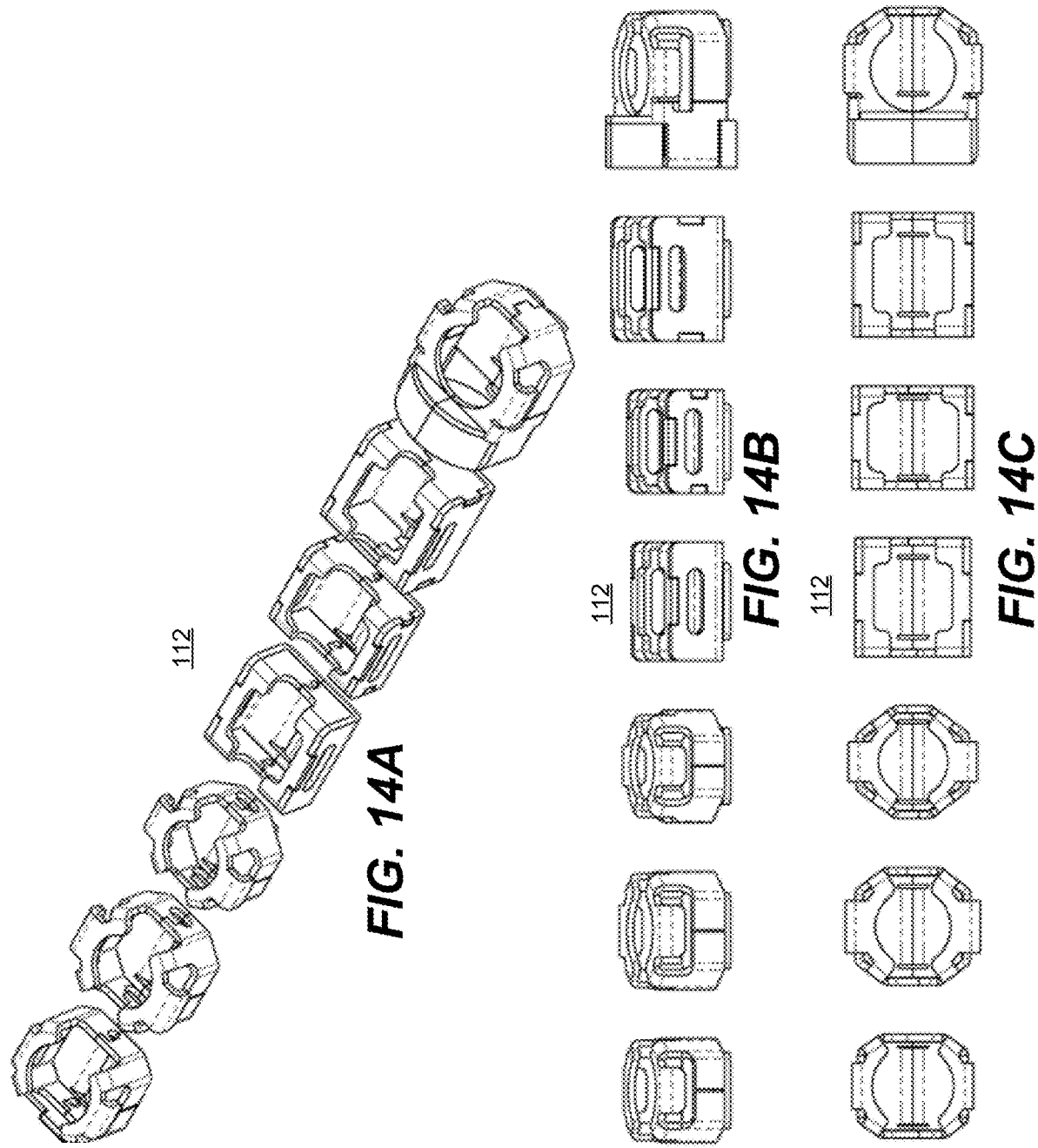

APPARATUSES THAT SECURE WEARABLES TO DISPLAY TABLES AND OTHER DISPLAY SURFACES

FIELD OF TECHNOLOGY

Embodiments of the present technology relate to apparatuses that secure wearable electronic devices to tabletops of display tables and to other display surfaces.

BACKGROUND

Wearable electronic devices, such as smart watches and fitness trackers, are often sold in retail stores. To enable customers to view, touch, and interface with such wearable electronic devices, which are also referred to herein more succinctly as "wearables", such wearables are often displayed on a display table. Since such wearables are often costly, it would be preferably if they could be secured to the display table to prevent theft. While there are currently some apparatuses available to securely display wearables in retail stores, it would be beneficial if further and improved display apparatus were available.

SUMMARY

Security apparatuses of the present technology are adapted to selectively secure a wearable device to a tabletop of a display table or to another display surface. In accordance with certain embodiments, a security apparatus comprises a neck, a support shelf, and a brace. The neck includes first and second neck portions configured to be selectively attached to and detached from one another. The support shelf includes first and second shelf portions. The first shelf portion is fixedly attached to an upper end of the first neck portion. The second shelf portion is fixedly attached to an upper end of the second neck portion. The brace includes first and second brace elements. The first brace element is configured to be selectively attached to the first shelf portion while the first and second neck portions are detached from one another. The second brace element is configured to be selectively attached to the second shelf portion while the first and second neck portions are detached from one another. The brace is configured to encase at least a portion of a housing of a wearable device to thereby secure the wearable device to the support shelf, while the first and second brace elements are attached to the first and second shelf portions, respectively, and the first and second neck portions of the neck are attached to one another. In accordance with certain embodiments, the neck holds the support shelf, and any wearable device whose housing is at least partially encased by the brace that is attached to the support shelf, at a distance above a tabletop of a display table or other display surface.

In accordance with certain embodiments, after the first and second brace elements of the brace have been attached to the first and second shelf portions of the support shelf, and the first and second neck portions have been attached to one another while at least a portion of a housing of a wearable device is encased within the brace, the housing of the wearable device cannot be removed from the brace so long as the first and second neck portion continued to be attached to another.

In accordance with certain embodiments, the security apparatus further comprises one or more fasteners configured to selectively attach the first and second neck portions to one another. In accordance with certain embodiments, the security apparatus further comprises a collar configured to be slid over and encase peripheries of the first and second neck portions while the first and second neck portions are attached to one another by the one or more fasteners, thereby covering the first and second neck portions and the one or more fasteners. In accordance with certain embodiments, the security apparatus also includes one or more further fasteners extending from and/or attached to a lower end of at least one of the neck portions. The one or more further fasteners is/are configured to be used to secure the security apparatus to a tabletop of a display table or another display surface.

In accordance with certain embodiments, after the collar has been slid over the first and second neck portions that have been attached to one another, the first and second neck portions cannot be removed from one another so long as the collar continues to cover the first and second neck portions. Additionally, after the first and second brace elements of the brace have been attached respectively to the first and second shelf portions of the support shelf, and the first and second neck portions have been attached to one another while at least a portion of a housing of a wearable device is encased within the brace, the housing of the wearable device cannot be removed from the brace so long as the first and second neck portions continue to be attached to another, and thus, so long as the collar continues to cover the first and second neck portions.

In accordance with certain embodiments, the brace is also configured to encase at least a portion of a charger that is adjacent to an underside of the wearable device, thereby enabling the charger to be used to charge the wearable device while the wearable device is secured to a tabletop of a display table or to another display surface by the security apparatus.

In accordance with certain embodiments, each of the first and second brace elements includes a respective side opening that allows straps extending from opposing sides of a housing of a wearable device to extend through the side openings while the first and second brace elements encase at least a portion of the housing of the wearable device.

In accordance with certain embodiments, at least one of the first and second brace elements of the brace also includes one or more button openings that allow one or more buttons on a housing of a wearable device to be accessed by a person while at least a portion of the housing of the wearable device is encased by the brace.

In accordance with certain embodiments, each of the first and second shelf portions includes one or more respective openings, and each of the first and second brace elements includes one or more respective hooks extending from an underside thereof. The one or more respective hooks of the first brace element is/are configured to be inserted into the one or more respective openings in the first shelf portion. The one or more respective hooks of the second brace element is/are configured to be inserted into the one or more respective openings in the second shelf portion. In certain embodiments, each of the first and second neck portions includes an upper neck opening proximate to where the first and second shelf portions are attached, respectively, to the first and second neck portions.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 13A, 13B, 13C, 13D, 13E, and 13F are respectively, front perspective, rear perspective, exploded, top, side, and front views of the brace elements introduced in FIGS. 12A-12C.

FIGS. 14A, 14B, and 14C are various views of even further versions of a brace of a security apparatus of embodiments of the present technology.

DETAILED DESCRIPTION

The benefits, features, and advantages of the various embodiments of the present technology will become better understood with regard to the following description and accompanying drawings. The following description is presented to enable one of ordinary skill in the art to make and use embodiments of the present technology as provided within the context of a particular application and its requirements. Various modifications to the embodiments described herein will, however, be apparent to one skilled in the art, and the general principles defined herein may be applied to other embodiments. Therefore, the embodiments of the present invention are not intended to be limited to the particular embodiments shown and described herein, but are to be accorded the widest scope consistent with the principles and novel features herein disclosed.

Figure 1:
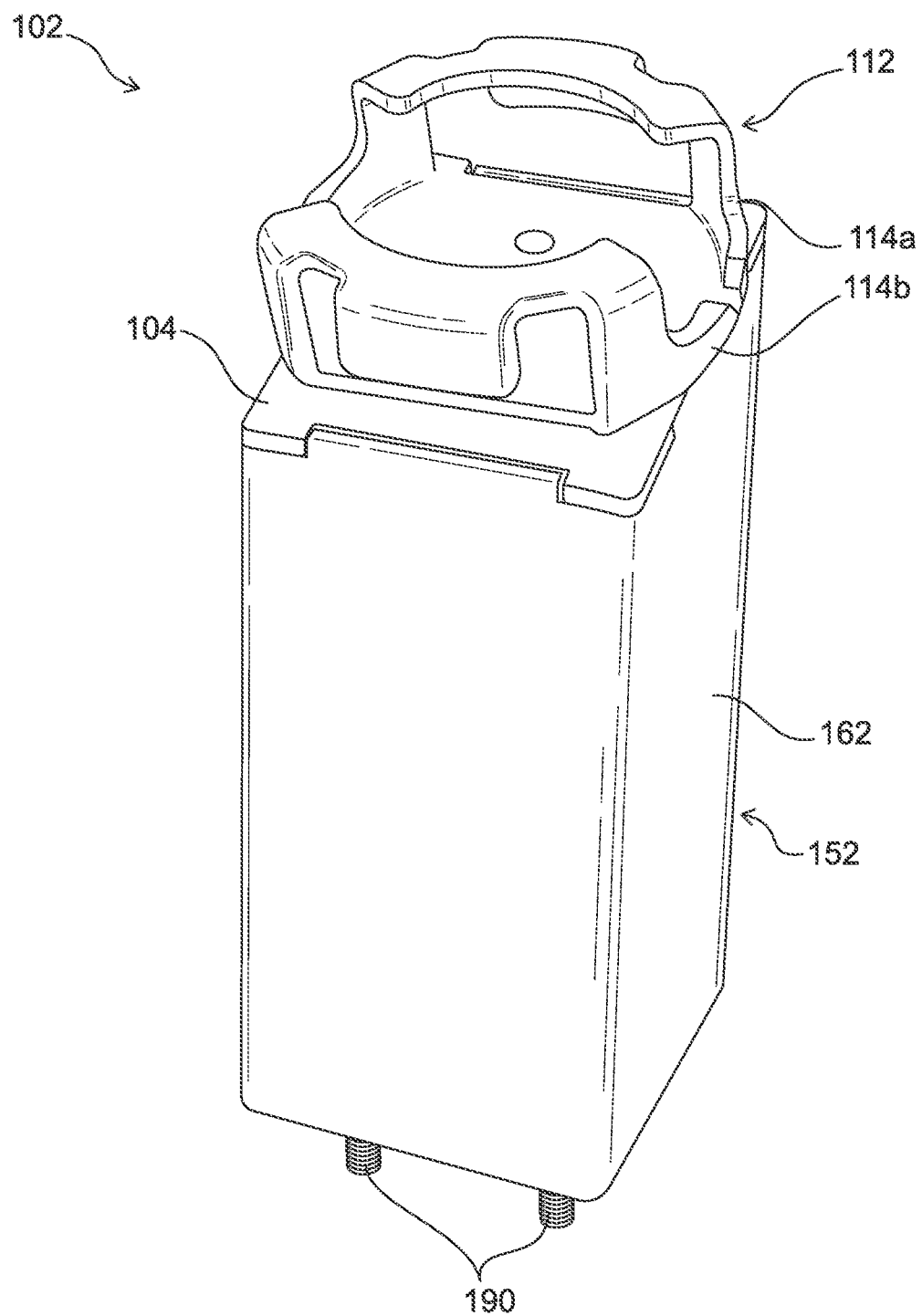
FIG. 1 is a front perspective view of a security apparatus according to an embodiment of the present technology.

FIG. 1 is a front perspective view of a security apparatus 102 according to an embodiment of the present technology. The security apparatus 102 is used to secure a wearable electronic device, which is also referred to herein more succinctly as a "wearable," to a tabletop of a display table or to another surface. As shown in FIG. 1, as well as other FIGS., the security apparatus 102 includes a support shelf 104, a brace 112, and a neck 152. The neck 152 is used to hold the support shelf 104 (and any wearable secured thereto) at a distance above (and preferably at an acute angle, e.g., 15 degrees, relative to) a tabletop of a display table, or to another display surface. The brace 112, which includes a first brace element 114a and a second brace element 114b, is used to secure a wearable to the support shelf 104, to thereby secure the "wearable" to the tabletop of a display table (or to another display surface) at a distance above (and preferably at an acute angle, e.g., 15 degrees, relative to) a tabletop of a display table (or to another display surface). For much of the remaining discussion it is assumed that the wearable that is being secured is a smart (or other type of) watch and/or fitness tracker that includes a strap for strapping the wearable to a person's wrist. Additionally, for much of the remaining discussion it is assumed that the apparatus 102 is being used to secure the wearable to a tabletop of a display table. However, it should be noted that the apparatus 102 can alternatively be used to secure a smart (or other type of) watch or other type of wearable to some other type of display surface besides a display table, e.g., to a display wall, or the like.

Figure 2:
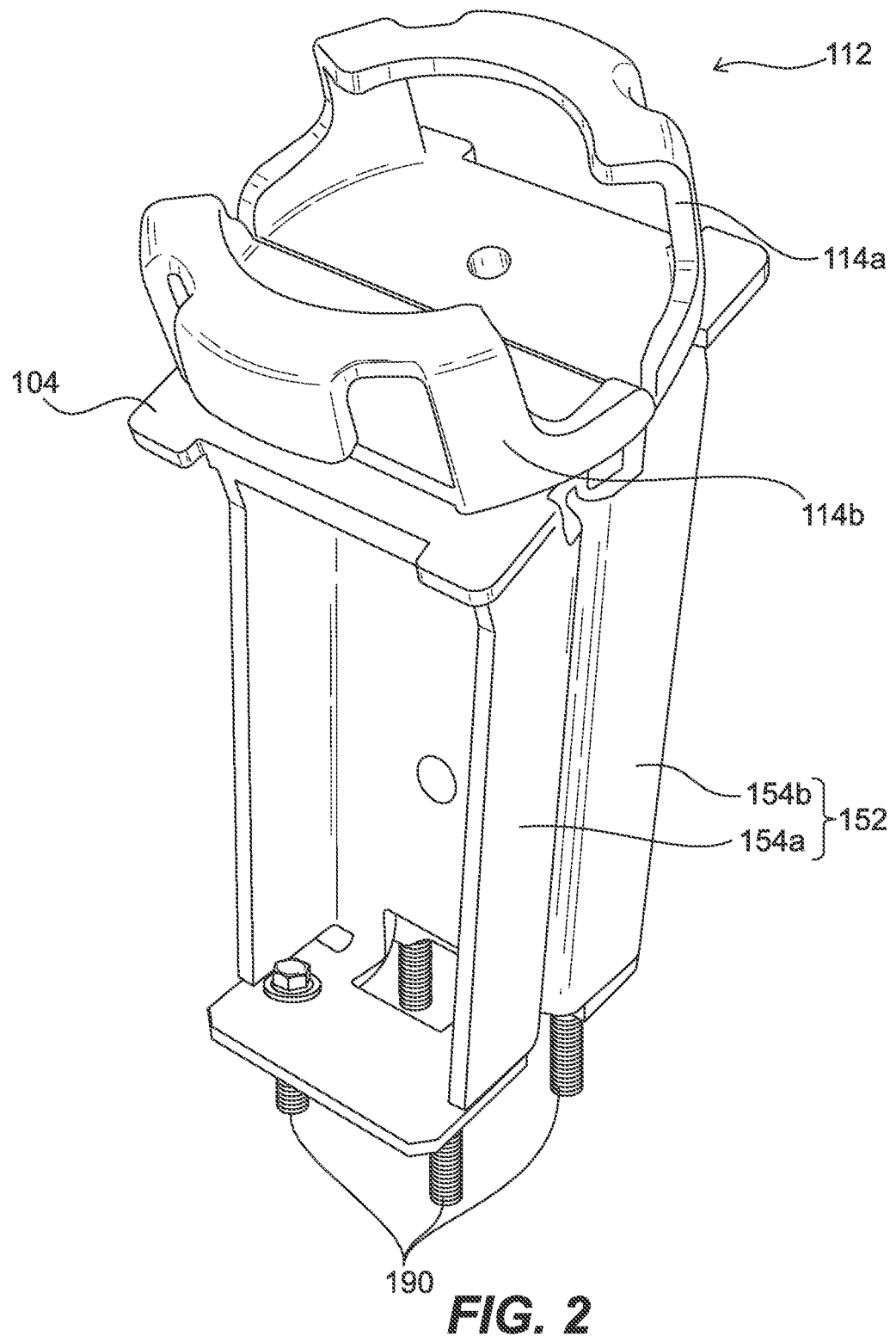
FIG. 2 is a front perspective view of the security apparatus introduced in FIG. 1, with the collar thereof removed to show additional details of the neck of the security apparatus.
Figure 3:
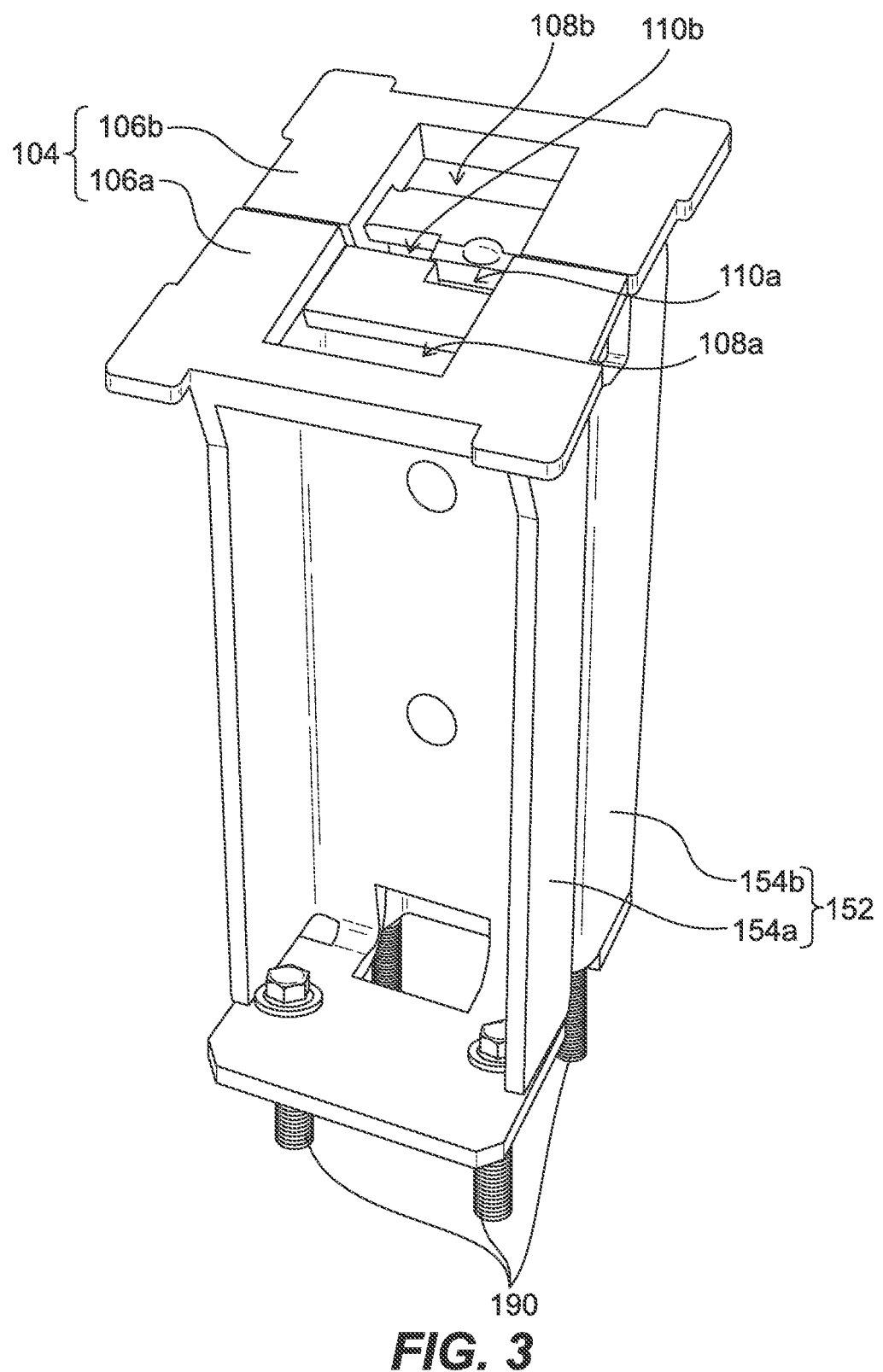
FIG. 3 is a front perspective view of the security apparatus introduced in FIG. 2, with the brace thereof removed to show additional details of the support shelf of the security apparatus.
Figure 4A:
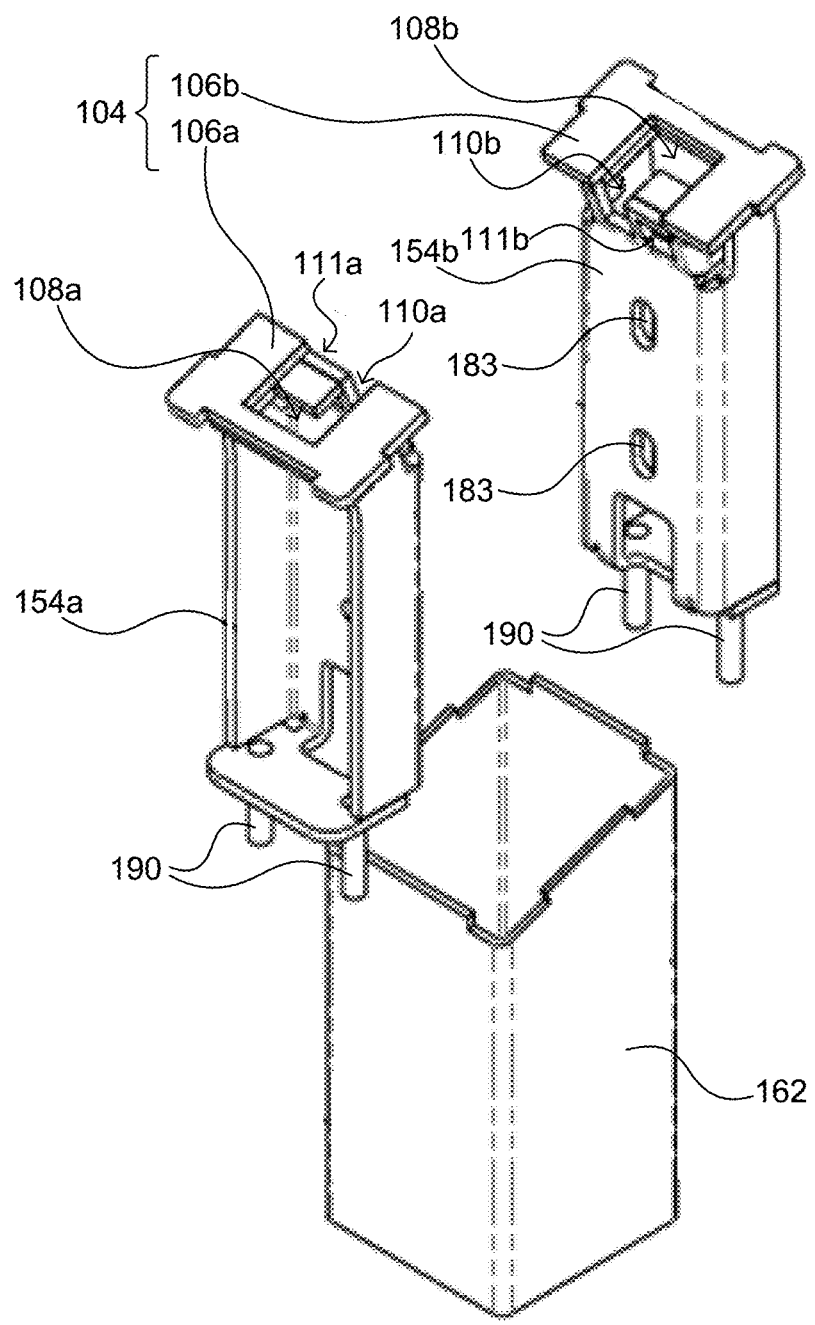
FIG. 4A shows how first and second neck portions can be separated from one another, as well as how the collar can be removed.
Figure 4B:
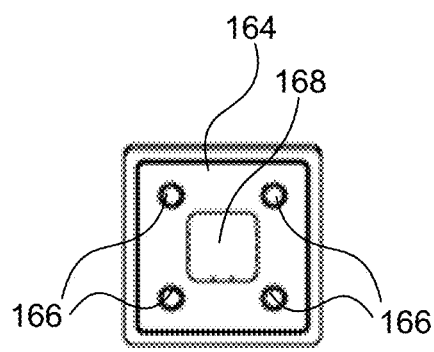
FIG. 4B shows a bottom view of the collar.
Figure 5A:
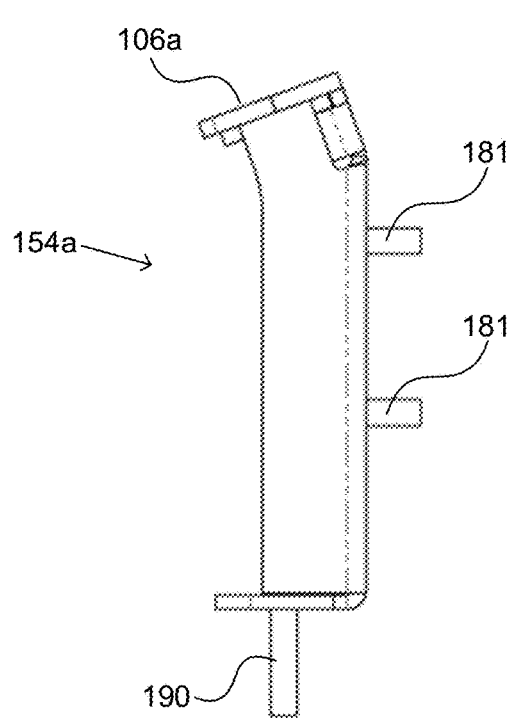
FIGS. 5A and 5B are, respectively, side and front views of the first neck portion.
Figure 6A:
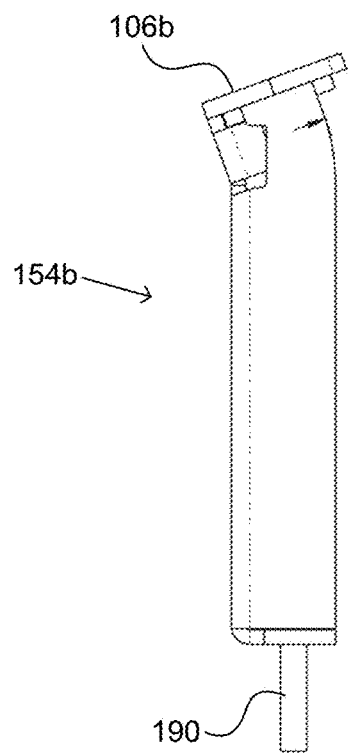
FIGS. 6A and 6B are, respectively, side and front views of the second neck portion.
Figure 5B:
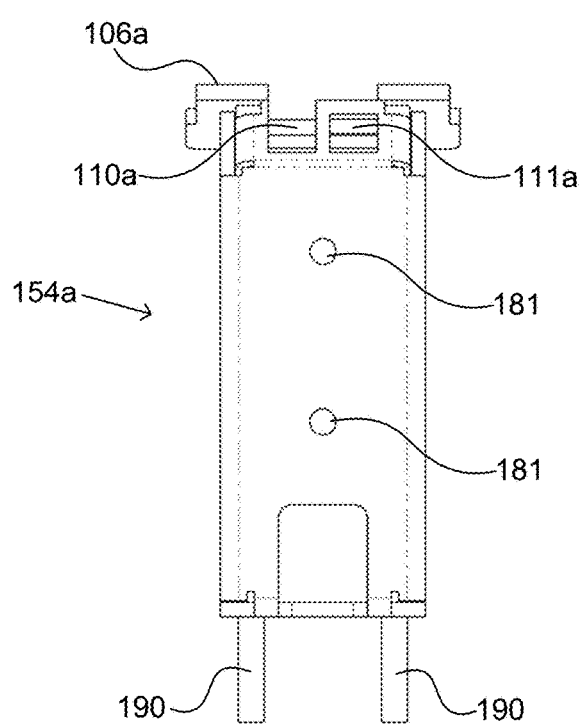
Figure 6B:
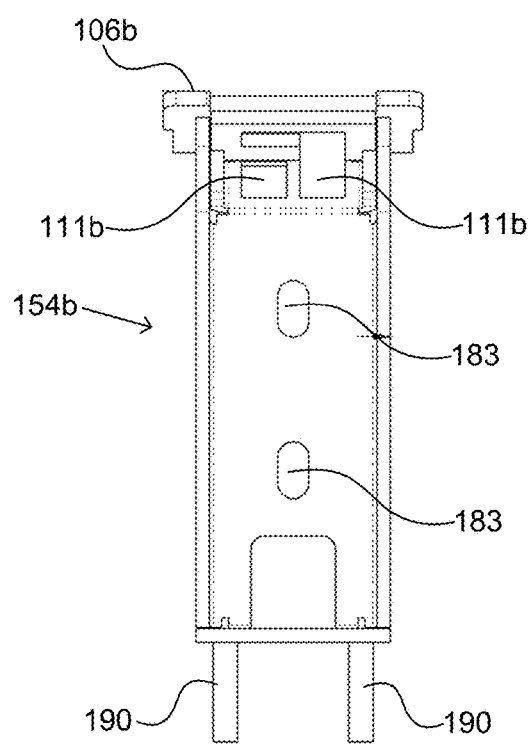

The neck 152, as can be appreciated from FIGS. 2 and 3, as well as some of the other FIGS., includes a first neck portion 154a, a second neck portion 154b, and a collar 162. The support shelf 104, as can be appreciated from FIG. 3, as well as some of the other FIGS., includes a first shelf portion 106a and a second shelf portion 106b. In FIG. 1 the first and second neck portions 154a, 154b are surrounded by the collar 162. FIG. 4A shows the first and second neck portions 154a, 154b separated from one another, with the collar 162 removed. FIGS. 5A and 5B are, respectively, side and front views of the first neck portion 154a, with the first shelf portion 106a attached at the top of the first neck portion 154a. FIGS. 6A and 6B are, respectively, side and front views of the second neck portion 154b, with the second shelf portion 106b attached at the top of the second neck portion 154b. FIG. 4B, which is a bottom view of the collar 162, shows that at the bottom of the collar is a baseplate 164 including through-holes 166 through which the bolts 190 extending downward from the neck 152 can be inserted. The baseplate 164 prevents the collar 162 from being lifted, twisted, or removed by a thief after the security apparatus 102 has been secured to a tabletop of a display table from an underside thereof. As shown in FIG. 4B, the baseplate 164 includes a central opening 168 for a charging cable that is fed through the neck 152 (between one of the neck portions 154 and an interior wall of the collar 162) to be passed. Such a charging cable (e.g., 173 in FIGS. 12A-12C) can then be inserted through a corresponding opening in a tabletop of a display table or in some other display surface and thereby plugged into a power source.

Referring to FIGS. 5A, 5B, 6A, and 6B the first neck portion 154a includes a pair of bolts 181 and the second neck portion 154b including a pair of through-holes 183. A center-to-center distance between the pair of bolts 181 is the same as the center-to-center distance between the pair of through-holes 183. Referring briefly back to FIG. 3, when the first and second neck portions 154a, 154b are placed adjacent to one another, with the bolts 181 extending through the through-holes 183, the first and second shelf portions 106a, 106b form the complete support shelf 104. In accordance with the embodiments shown in FIGS. 4A, 6A, and 6B, each of the through-holes 183 is a slotted through-hole, which makes easier the attachment of the first and second neck portions 154a, 154b to one another.

As also shown in FIG. 3, the support shelf 104 (and more specifically the first support shelf portion 106a thereof) includes an outer opening 108a and an inner opening 110a. Similarly, the support shelf 104 (and more specifically the second support shelf portion 106b thereof) also includes an outer opening 108b and an inner opening 110b. As will be described in additional detail below, the outer and inner openings 108a, 110a are used to secure the first brace element 114a to the first shelf support portion 106b, and thereby to the first neck portion 154a. Similarly, the outer and inner openings 108b, 110b are used to secure the second brace element 114b to the second shelf support portion 106b, and thereby to the second neck portion 154b.

As shown in FIGS. 4 and 5B, the inner opening 110a also extends into part of the first neck portion 154a, and spaced apart therefrom is a first upper neck opening 111a. Similarly, as shown in FIGS. 4 and 6B, the inner opening 110b also extends into part of the second neck portion 154b, and spaced apart therefrom is a second upper neck opening 111b.

In the embodiment shown, the first and second neck portions 154a, 154b are configured to be attached to one another after the first brace element 114a is secured to the first shelf portion 106a and thereby secured to the first neck portion 154a and the second brace element 114b is secured to the second shelf portion 106b and thereby secured to the second neck portion 154b, which has the effect of positioning the first and second brace elements 114a, 114b adjacent to one another to form the complete brace 112, as shown in FIG. 1. More specifically, the bolts 181 that extend from the first neck portion 154a are aligned with and pass through the through-holes 183 of the second neck portion 154b, and then are attached to one another using nuts (e.g., wing-nuts, not shown), or some other type of fasteners (besides nuts and bolts). In an alternative embodiment, both of the neck portions 154a, 154b include respective through-holes, and a pair of bolts are passed through the through-holes of the neck portions 154a, 154b, and nuts and bolts are used to secure that neck portions 154a, 154b to one another. Alternative embodiments can include more or less than two through-holes and two bolts. The bolts 181 and nuts can be referred to collectively as fasteners or fastener hardware. Other types of fasteners can alternatively or additionally be used. The first and second neck portions 154a, 154b cannot be seen in FIG. 1, because they are covered by a collar 162 that is configured to be slid over and encase peripheries of the first and second neck portions 154a, 154b. While the collar 162 is shown as having a squared column shape, the collar 162 can alternatively have other shapes, such as cylindrical, an octagonal column shape, or the like.

In accordance with certain embodiments, as will be discussed in further detail below, e.g., with reference to FIGS. 11A and 11B, after the first brace element 114a is secured to the first shelf portion 106a and thereby secured to the first neck portion 154a, and the second brace element 114b is secured to the second shelf portion 106b and thereby secured to the second neck portion 154b, a charger (e.g., 172) and a housing (e.g., 194) of a wearable (e.g., 192) can be placed within the brace elements 114a, 114b before the first and second neck portions 115a, 115b are attached to on another. Then, after the first and second neck portions 115a, 115b are attached to on another, the charger and the wearable are secured within the brace 112 that includes the brace elements 114a, 114b. More specifically, a housing of a wearable can be at least partially encased by the brace 112 by sandwiching the housing of the wearable between the brace elements 114a, 114b.

One or more bolts 190 (or other types of fasteners) extend from the distal end of each of the first and second neck portions 154a, 154b. As can be seen from the side view in FIG. 1, while the collar 162 is encasing the peripheries of the first and second neck portions 154a, 154b, the bolts 190 extend downward from the neck 152 (and more specifically, from distal ends of the first and second neck portions 154a, 154b) thereby enabling the bolts 190 to be inserted into through-holes in a tabletop of a display table (or in some other display surface). Nuts (e.g., wingnuts) and/or other fastener hardware can then be used to secure the security apparatus 102 to a tabletop from the underside of the tabletop. Preferably, the underside of the tabletop is made inaccessible to customers and potential thieves in a retail store, e.g., by being encased in a locked enclosure. This way potential thieves cannot remove the security apparatus 102 from the display table, and thus, could not steal the wearable (e.g., smart watch and/or fitness tracker) that is secured to the display table by the security apparatus 102. Further, while the security apparatus 102 is secured to a display table, the collar 162 cannot be removed, and thus, a potential thief cannot access the fasteners (e.g., the bolts 181 and the nuts shown) that keep the first and second neck portions 154a, 154b attached to one another.

Figure 7A:
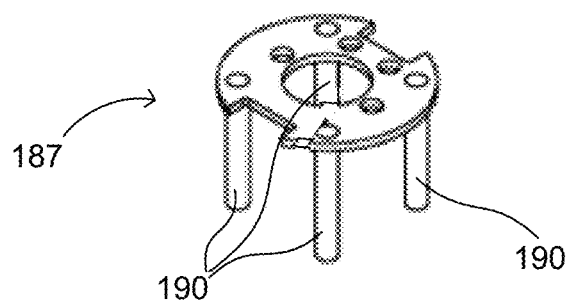
FIGS. 7A, 7B and 7C show example types of neck bases that can be attached to the neck of the security apparatus.
Figure 7B:
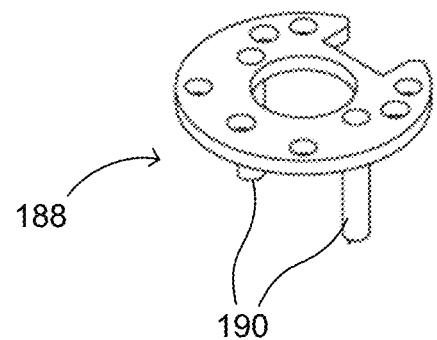
Figure 7C:
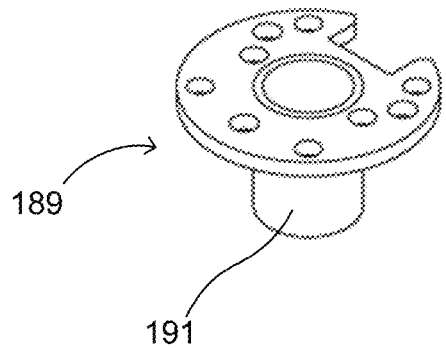

In FIG. 5B, a first pair of bolts 190 are shown extending directly from the distal end of the first neck portion 154a, and in FIG. 5B a second pair of bolts 190 are shown as extending directly from the distal end of the second neck portion 154b. More or less bolts may extend from each of the neck portions 154a, 154b. In an alternative embodiment of the security apparatus 102, the distal ends of the first and second neck portions 154a, 154b include through holes to which a neck base can be attached (e.g., using bots and nuts or other types of fasteners), and bolts 190 (or other types of fasteners) extend from the neck base. After the neck base is attached to the first and second neck portions 154a, 154b the collar 162 is used to encase the peripheries of the first and second neck portions 154a, 154b and the neck base, after which the bolts 190 will extend downward beyond the collar 162 to allow the security apparatus 102 to be attached to a tabletop or to another display surface. Examples of such a neck base are shown in FIGS. 7A, 7B and 7C. In FIG. 7A, a neck base 187 is shown as including four bolts 190 extending downward therefrom. In alternative embodiments, the neck base 187 can include more or less than four bolts 190, e.g., just two or three bolts 190, or more than four bolts.

FIGS. 7B and 7C show alternative types of neck bases that can be attached to the first and second neck portions 154a, 154b of the security apparatus 102, in place of the neck base 187 shown in FIG. 7A. More specifically, FIG. 7B shows a neck base 188 that includes two bolts 190 that are in-line with another and can be used to secure the security apparatus 102 to a tabletop or other display surface that includes one or more slots into which the bolts 190 can be inserted and secured from the underside or backside of the tabletop or other display surface, e.g., using wingnuts or other types of nuts. The bolts 190 shown in FIG. 7B can alternatively be inserted into through holes rather than slots in a tabletop or other display surface. After the neck base 188 is attached to the first and second neck portions 154a, 154b the collar 162 is used to encase the peripheries of the first and second neck portions 154a, 154b and the neck base 188, after which the bolts 190 will extend downward beyond the collar 162 to allow the security apparatus 102 to be attached to a tabletop or to another display surface.

FIG. 7C shows a neck base 189 that includes a single cylindrical threaded rod 191 that can be inserted into a hole in a tabletop or other display surface and secured from the underside or backside of the tabletop or other display surface, e.g., using an appropriately sized wingnut or other type of nut or fastener. The diameter of the threaded rod 191 can be, e.g., between 0.5 inches and 0.75 inches, but is not limited thereto. After the neck base 189 is attached to the first and second neck portions 154a, 154b, the collar 162 is used to encase the peripheries of the first and second neck portions 154a, 154b and the neck base 189, after which the threaded rod 191 will extend downward beyond the collar 162 to allow the security apparatus 102 to be attached to a tabletop or to another display surface. FIGS. 7A through 7C can be referred to collectively as FIG. 7. In the FIGS., to avoid clutter and complexity in the drawings, the threads on the outer circumferences of the bolts 190 and the rod 191 are not shown. The bolts 190 and the rod 191 are examples of fasteners extending from or attached to a distal end of at least one of the neck portions 154a, 154b, and configured to be used to secure the security apparatus 102 to a tabletop of a display table or to another display surface.

Additionally details for the brace 112 introduced in FIG. 1 will now be discussed with references to FIGS. 8A-8C. As mentioned above in the discussion of FIG. 1, and shown in FIG. 8A, the brace 112 includes a first brace element 114a and a second brace element 114b. In accordance with certain embodiments, the first and second brace elements 114a, 114b are the same one another, and thus, are interchangeable (similar to two semicircles having the same radius being the sane as one another and interchangeable with one another). Each of the first and second brace elements 114a, 114b can be referred to individually as a brace element 114, or collectively as the brace elements 114. The brace elements 114 can also be referred to interchangeably herein as brace elements 114, or individually as a brace element 114.

Figure 8A:
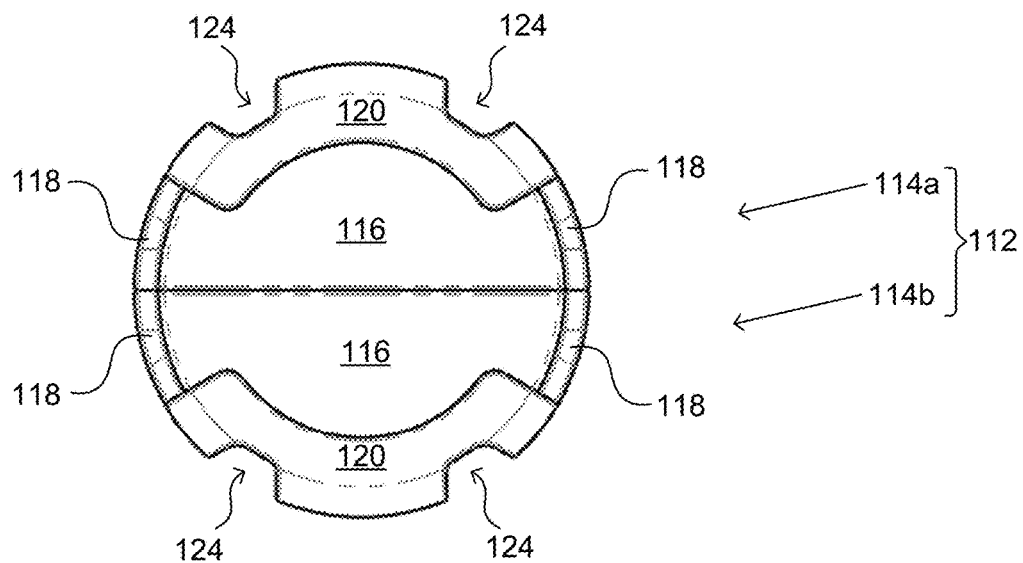
FIG. 8A is a top view of the brace introduced in FIG. 1.
Figure 8B:
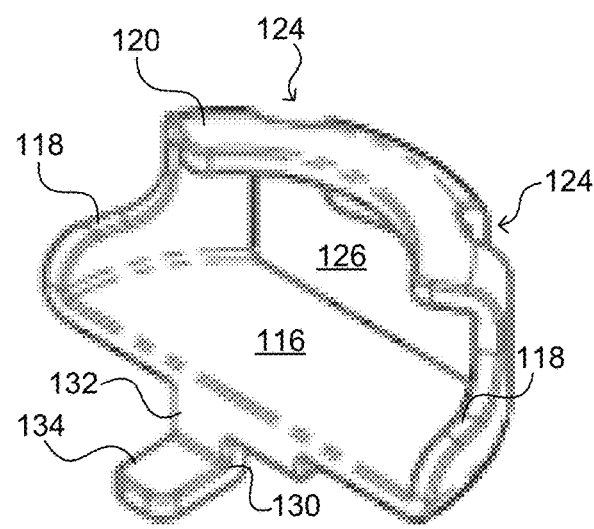
FIGS. 8B and 8C are, respectively, front and rear perspective views of one of the brace elements of the brace shown in FIG. 8A.
Figure 8C:
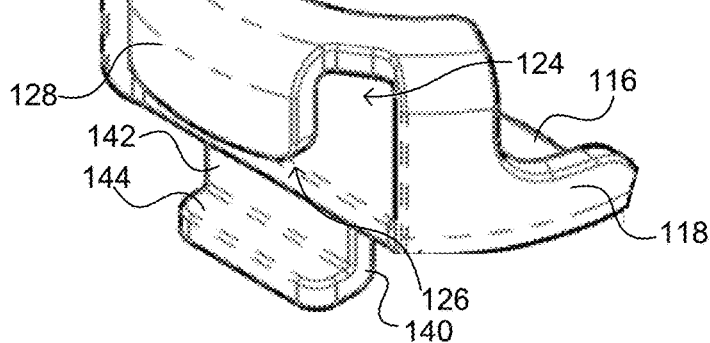

Referring to FIGS. 8A-8C, each brace element 114 is shown as including a base 116, a pair of sidewalls 118 that extend upward from the base 116, and an inwardly projecting rim 120 that extends between the pair of sidewalls 118 and above a portion of the base 116. Between the pair of sidewalls 118 is a side opening 126. Extending downward from the rim 120 is a downwardly projecting flange 128 that defines an upper boundary of the side opening 126. Each brace element 114 also includes a pair of button openings 124, with each of the button openings 124 being a gap between the flange 128 and a sidewall 118. As the name suggests, each button opening 124 provide a person with access to a button on the wearable device (e.g., smart watch and/or fitness tracker) that is being secured to a display surface by the security apparatus 102. More or less button openings 124 than shown can be included in a brace 112. The side opening 126 provide an opening through which a strap of the wearable device can be extended. The sidewalls 118, inwardly projecting rim 120, and downwardly projecting flange 128 hold the wearable device securely in place and prevent the wearable device from being removed from the security apparatus 102 by a potential thief. FIGS. 8A-8C can be referred to collectively herein as FIG. 8.

As best seen in the front perspective view of the brace element 114 shown in FIG. 8B, a downwardly projecting post 132 extends downward from a side of the base 116 that is opposite the side opening 126. Further, an inward projecting lip 134 extends inward from the post 132 in a direction away from the side opening 126. The downward projecting post 132 and the inward projecting lip 134 collectively provide an inner L-shaped hook 130. As best seen in the rear perspective view of the brace element 114 shown in FIG. 8C, a further downward projecting post 142 extends downward from a side of the base 116 proximate to the side opening 126. Further, an outward projecting lip 144 extends from outward from the post 142 in a direction opposite the inward projecting lip 134. The downward projecting post 142 and the outward projecting lip 144 collectively provide an outer L-shaped hook 140.

As can be appreciated from FIGS. 1, 2, and 8, as well as other FIGS. discussed below, such as FIG. 11B, the brace 112 is designed to enable a person to observe and touch a screen of a wearable that is at least partially encased by the brace 112. This enables a person to observe the ornamental and function features of the wearable, and enables a person to interact with a touch screen of the wearable, if the wearable includes a touch screen. Further, as noted above, the button openings 124 provide a person with access to buttons on the wearable device (e.g., smart watch and/or fitness tracker) that is being secured to a display surface by the security apparatus 102. The side openings 126 provide an opening through which straps of the wearable device can be extended, as can best be seen in FIG. 11B. The sidewalls 118, inwardly projecting rim 120, and downwardly projecting flange 128 hold the wearable device securely in place and prevent the wearable device from being removed from the security apparatus 102 by a potential thief, as noted above.

The first and second shelf portions 106a, 106b can be referred to collectively herein as the shelf portions 106, or individually as a shelf portion. Similarly, the first and second neck portions 154a, 154b can be referred to collectively herein as the neck portions 154, or individually as a neck portion 154. The outer openings 108a, 108b can be referred to collectively herein as the outer openings 108, or individually as an outer opening 108. Similarly, the inner openings 110a, 110b can be referred to collectively herein as the inner openings 110, or individually as an inner opening 110. The brace elements 114a, 114b can be referred to collectively herein as the brace elements 114, or individually as a brace element 114, as was already noted above.

Figure 9:
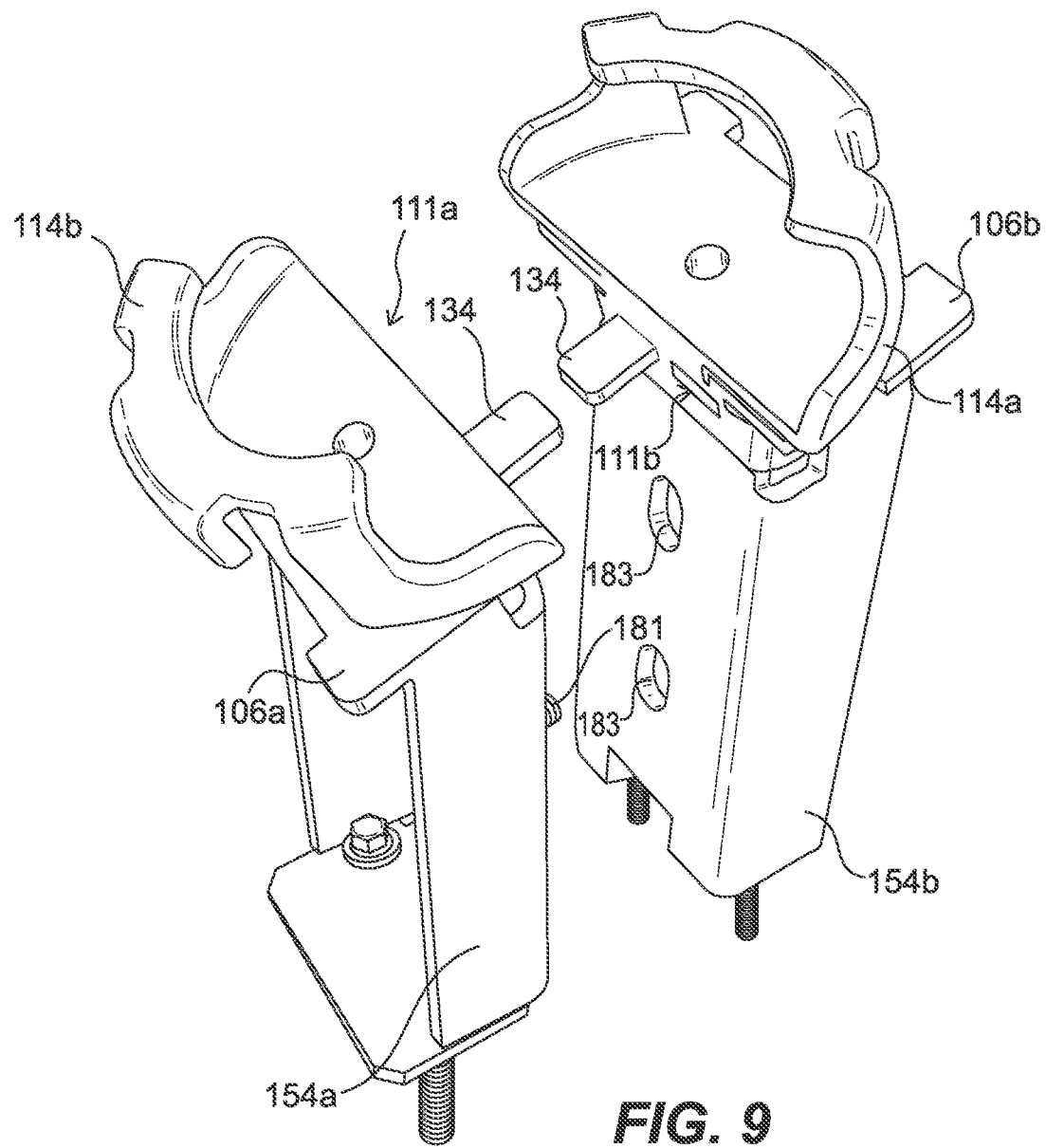
FIG. 9 shows how the brace elements can be selectively attached to the neck portions while the neck portions are separated from one another.
Figure 10D:
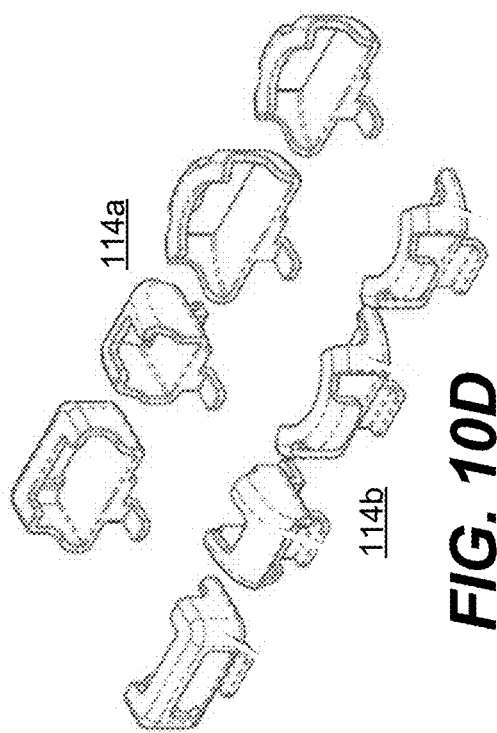
FIGS. 10A, 10B, 10C, and 10D are, respectively, perspective, top, front, and exploded views of four different versions of the brace of the security apparatus introduced in FIG. 1.
Figure 10A:
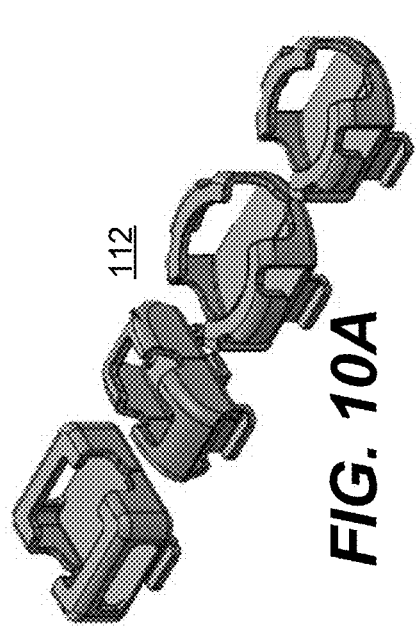
Figure 10B:
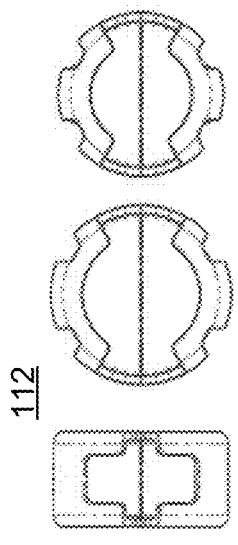
Figure 10C:
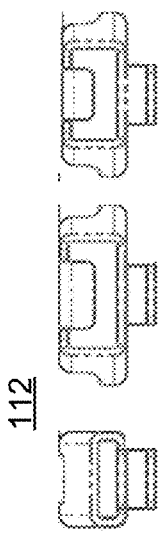

Referring briefly back to FIG. 4A, while the neck portions 154a, 154b are separated from one another: the outer L-shaped hook 140 of the brace element 114a can be slid at an angle into the outer opening 108a of the shelf portion 106a (after which the downward projecting post 132 of the inner L-shaped hook of the same brace element 114a rests within the inner opening 110a of the shelf portion 106a and the brace element 114a is coupled to and rests on the shelf portion 106a); and the outer L-shaped hook 140 of the brace element 114b can be slid at an angle into the outer opening 108b of the shelf portion 106b (after which the downward projecting post 132 of the inner L-shaped hook of the same brace element 114b rests within the inner opening 110b of the shelf portion 106b and the brace element 114b is coupled to and rests on the shelf portion 106b). In this manner, the brace element 114a can be selectively attached to the neck portion 154a, and the brace element 114b can be selectively attached to the neck portion 154b, as shown in FIG. 9. At this point in time, a charger (e.g., 172 in FIGS. 11A and 11B) and a housing of a wearable (e.g., 192 in FIGS. 11A and 11B) can be sandwiched between the brace elements 114a, 114b as the first and second neck portions 115a, 115b are moved towards one another such that the bolts 181 (extending from the neck portion 154a) are inserted through the through-holes (within the neck portion 154b). Simultaneously therewith, the inward projecting lip 134 (extending inward from the post 132 of the L-shaped hook of the brace element 114b) is inserted into the upper neck opening 111b in the neck portion 154b, and the inward projecting lip 134 (extending inward from the post 132 of the L-shaped hook of the brace element 114a) is inserted into the upper neck opening 111a in the neck portion 154a. At that point, the neck portions 154a, 154b are attached to one another using nuts (e.g., wing-nuts, not shown), or some other type of fasteners (besides nuts and bolts). Thereafter, the collar 162 is slid over the peripheries of the first and second neck portions 154a, 154b, thereby encasing the neck portions 154a, 154b and the fasteners that are securing the neck portions 154a, 154b to one another.

After the collar 162 encases the peripheries of the first and second neck portions 154a, 154b, the bolts 190 (or other types of fasteners, e.g., discussed with reference to FIGS. 7A-7C) extend downward from the neck 152 (and more specifically, from distal ends of the first and second neck portions 154a, 154b) thereby enabling the bolts 190 to be inserted into through-holes in a tabletop of a display table (or in some other display surface). As noted above, nuts (e.g., wingnuts) and/or other fastener hardware can then be used to secure the security apparatus 102 to a tabletop from the underside of the tabletop. As also noted above, the underside of the tabletop is preferably made inaccessible to customers and potential thieves in a retail store, e.g., by being encased in a locked enclosure so that potential thieves cannot remove the security apparatus 102 from the display table, and thus, could not steal the wearable (e.g., a smart watch and/or fitness tracker) that is secured to the display table by the security apparatus 102. As also noted above, while the security apparatus 102 is secured to a display table, the collar 162 cannot be removed, and thus, a potential thief cannot access the fasteners (e.g., the bolts 181 and the nuts shown) that keep the first and second neck portions 154a, 154b attached to one another.

FIGS. 10A, 10B, 10C, and 10D are, respectively, perspective, top, front, and exploded views of four different versions of the brace 112 of the security apparatus 102 introduced in FIG. 1. FIGS. 10A, 10B, 10C, and 10D, which can be collectively referred to as FIG. 10, shows that the brace 112 can be made in various different sizes and shapes. The specific size and shape of the brace 112, and the brace elements 114a, 114b thereof, can be customized for a specific wearable (e.g., smart watch and/or fitness tracker). This is because the case or housing of different wearables (e.g., different smart watches and/or fitness trackers) may have different shapes and sizes, such as, but not limited to, a square shape, a rectangular shape, or a circular shape. Further, the dimensions (e.g., length, width, and/or diameter) of the case or housing can be different for different wearables. Additionally, the locations, number, and sizes of the button openings 124 within each of the braces 112 can be customized for specific wearables.

Figure 11A:
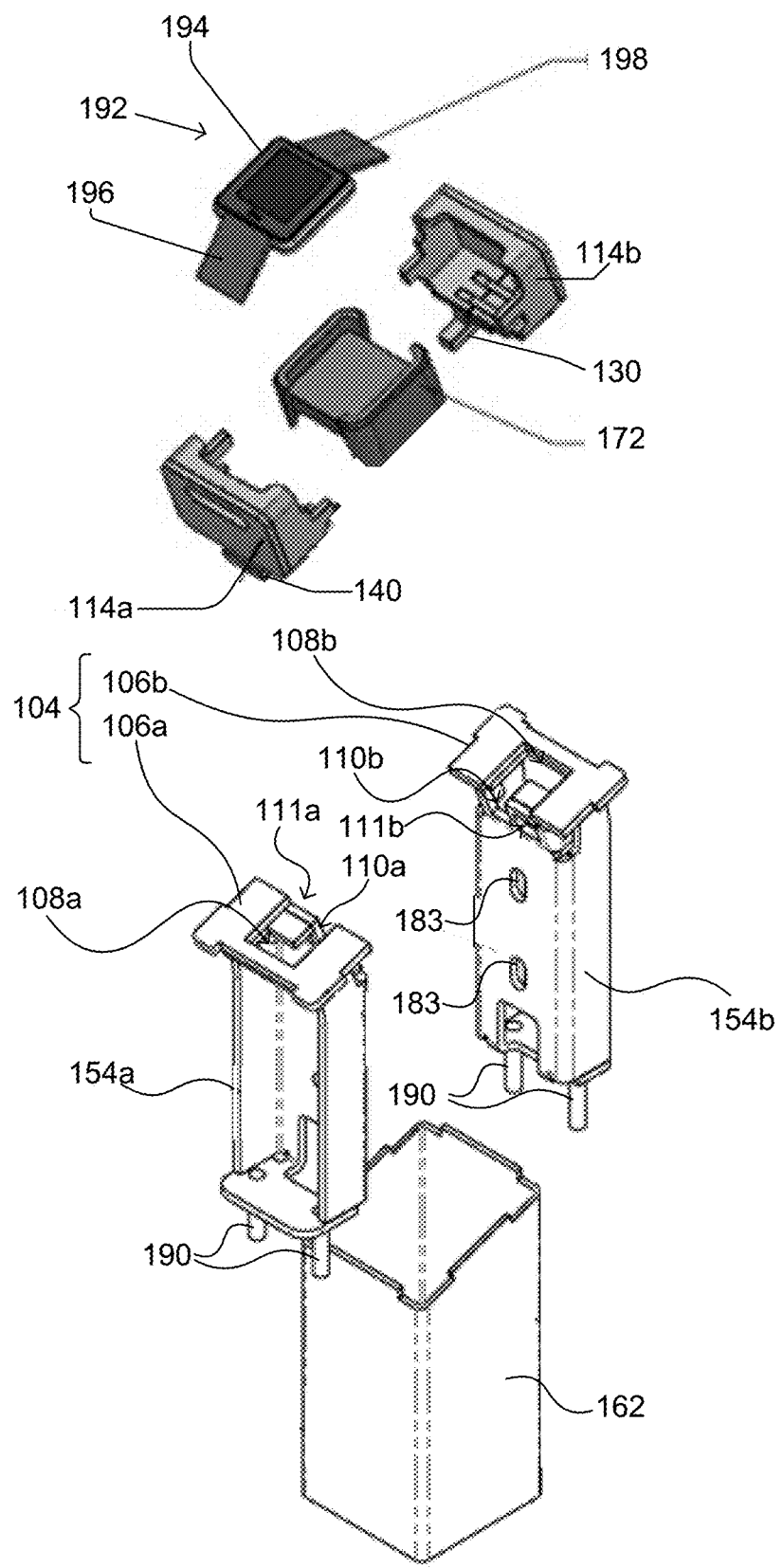
FIGS. 11A and 11B illustrate how a security apparatus of the present technology can be used to secure a wearable electronic device and a charger therefore to a tabletop of a display table or some other display surface.
Figure 11B:
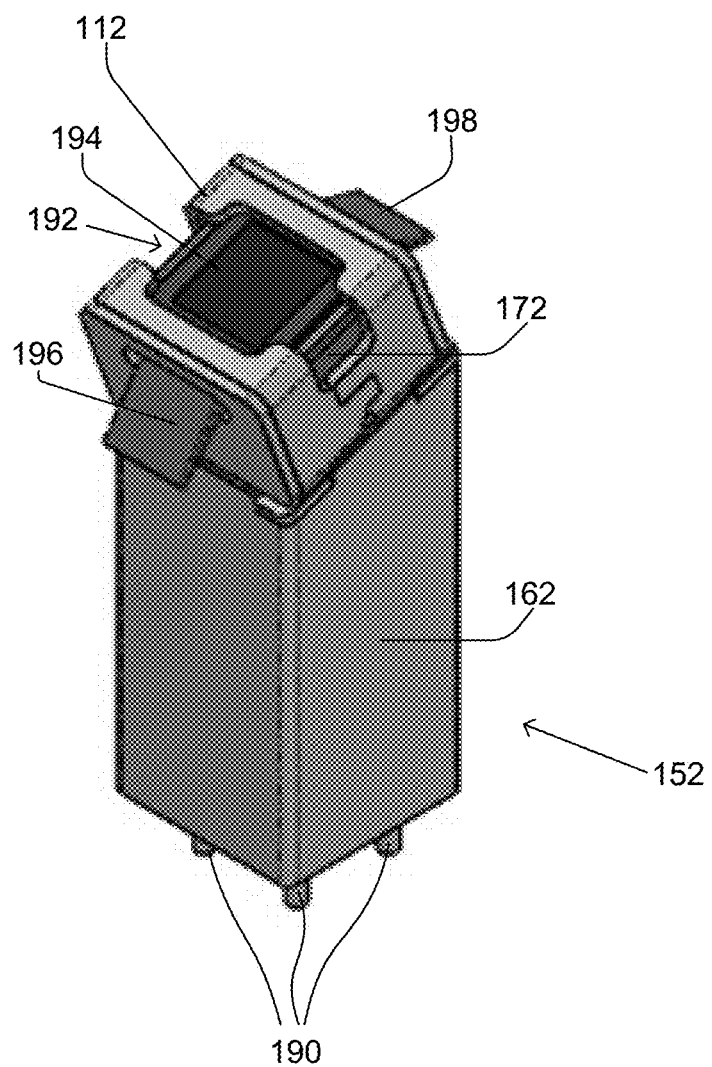

FIG. 11A shows a pair of brace elements 114a, 114b that are configured to encase at least a portion of a housing 194 of a wearable 192, wherein straps 196, 198 extend from opposing sides of the housing 194 of the wearable 192. As can be appreciated from FIG. 11B, while the wearable 192 is secured to the security apparatus 102, the straps 196, 198 that extend from opposing sides of the housing 194 of the wearable 192 extend through the side openings 126 in the brace elements 114a, 114b of the brace 112. FIGS. 11A and 11B can be referred to collectively herein as FIG. 11.

As can be appreciated from FIG. 11, the brace 112 is configured to encase at least a portion of a housing 194 of a wearable device 192, to thereby secure the wearable device 192 to the support shelf 104, while the first and second brace elements 114a, 114b are attached to the first and second shelf portions 106a, 106b, respectively, and the first and second neck portions of the neck are attached to one another. As noted above, and shown in FIG. 11, in addition to securing a wearable 192 within the brace 112 sandwiched between the brace element 114a, 114b of the brace 112, a charger 172 for the wearable can also be secured within the brace 112. In other words, the brace 112 (and its brace elements 114a, 114b) can be configured to encase at least a portion of both a housing 194 of a wearable 192 and a charger 172 adjacent thereto. In alternative embodiments, the brace 112 (and its brace elements 114a, 114b) can be configured to encase at least a portion of a housing of a wearable, without a charger being adjacent thereto.

Such a charger 172 is preferably capable of wirelessly charging the wearable 192, e.g., using electromagnetic, inductive, or radio frequency (RF) charging. For a more specific example, the charger 172 can utilize the Qi standard, which is an open interface standard, which was developed by the Wireless Power Consortium, and defines wireless power transfer using inductive charging over distances of up to 4 cm. In other words, the charger 172 can be a Qi charger, but is not limited thereto. Such a charger 172 can include a connector port (not shown), such as a USB or Lighting cable connector port, that enables the charger to be plugged into a power source via a universal serial bus (USB) or Lighting cable, or the like. The shape and size and overall form factor of the charger 172 can be customized for use with a specific wearable, and more generally, the size and shape of the brace 112 (and its brace elements 114) and the charger 172 can be collectively designed for use with a specific type of wearable.

Figure 12A:
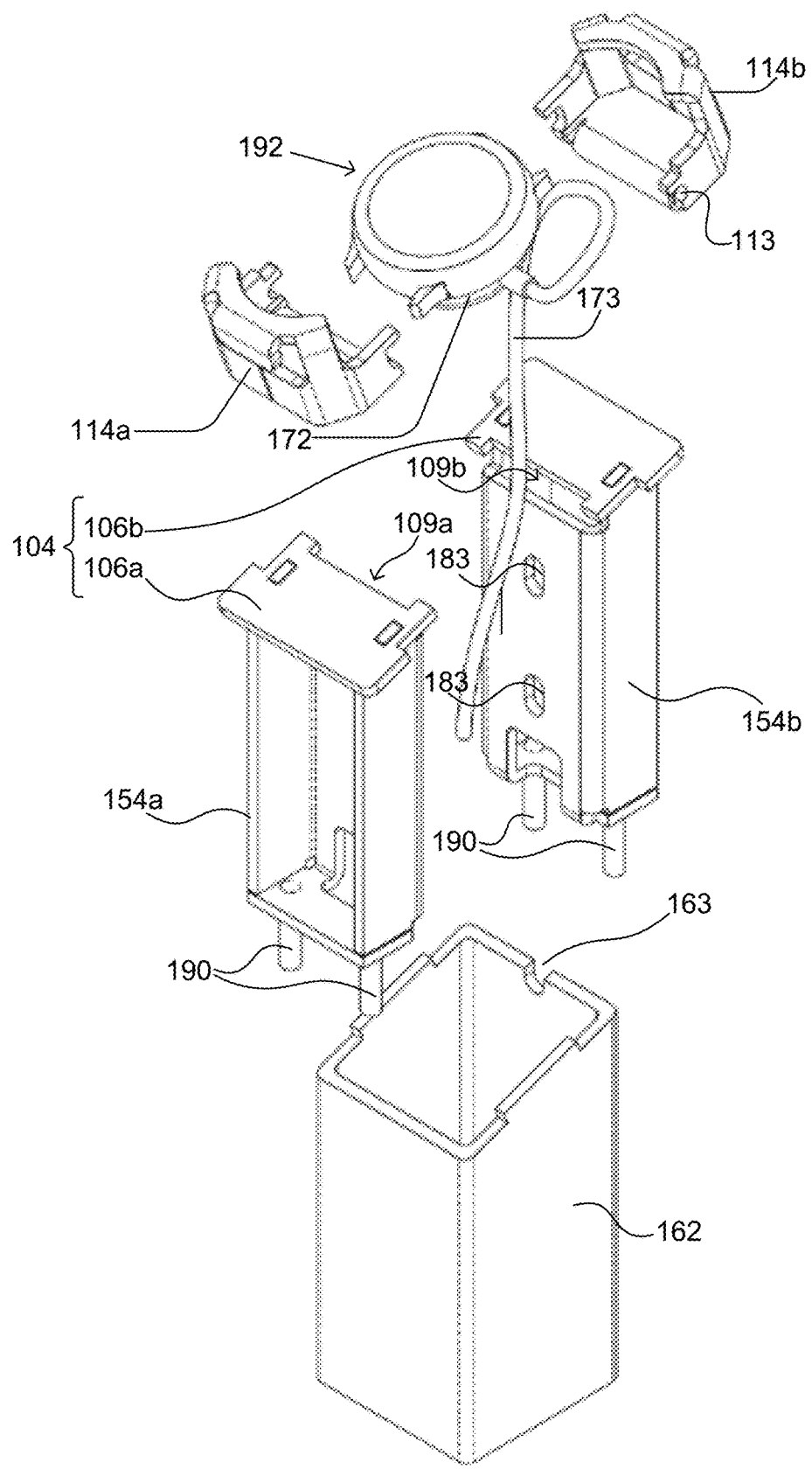
FIG. 12A is a front perspective view of a security apparatus according to another embodiment of the present technology before the various components thereof have been attached to one another to thereby secure a wearable electronic device and a charger therefore to a tabletop of a display table or some other display surface.
Figure 12B:
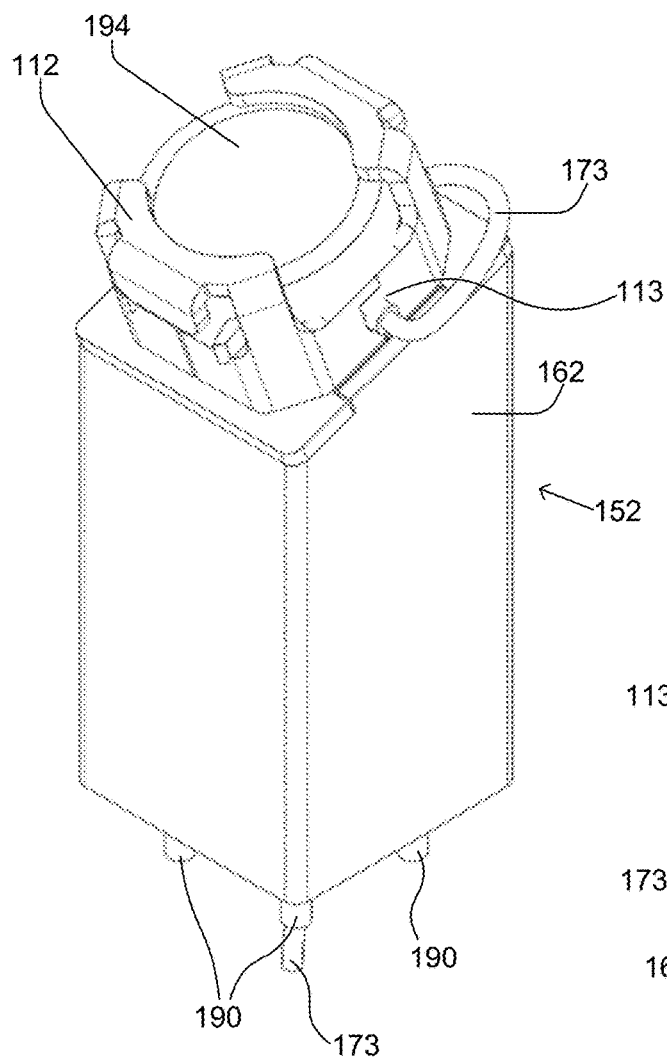
FIGS. 12B and 12C are front perspective and rear perspective views, respectively, of the embodiment of the security apparatus introduced in FIG. 12A after the various components thereof have been attached to one another to thereby secure a wearable electronic device and a charger therefore to a tabletop of a display table or to some other display surface.
Figure 12C:
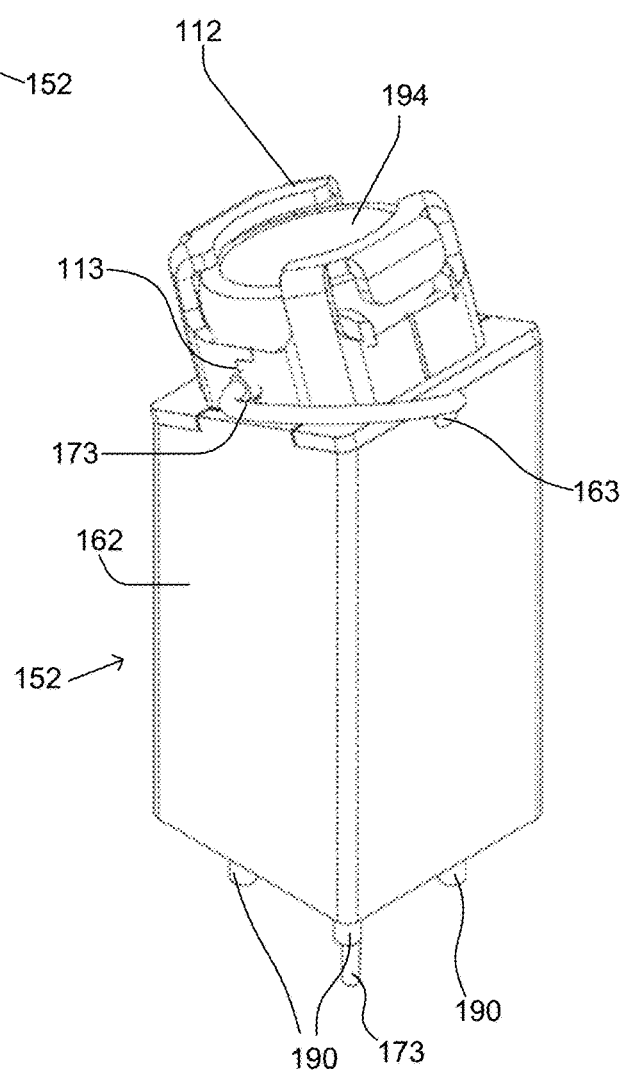

FIG. 12A is a front perspective view of a security apparatus 102 according to another embodiment of the present technology before the various components thereof have been attached to one another to thereby secure a wearable electronic device 192 and a charger 172 therefore to a tabletop of a display table or to some other display surface. FIGS. 12B and 12C are front perspective and rear perspective views, respectively, of the embodiment of the security apparatus 102 introduced in FIG. 12A after the various components thereof have been attached to one another to thereby secure the wearable electronic device 192 and the charger 172 therefore to a tabletop of a display table or some other display surface. FIGS. 12A-12C can be referred to collectively herein as FIG. 12. FIGS. 13A, 13B, 13C, 13D, 13E, and 13F are respectively, front perspective, rear perspective, exploded, top, side, and front views of the brace elements introduced in FIG. 12. FIGS. 13A-13F can be referred to collectively herein as FIG. 13. Components in FIGS. 12 and 13 that are the same or substantially the same as corresponding components described above with references to FIGS. 1 through 11 are labeled the same, and need not be described again in detail, since reference can be made to the description of such elements already described above. In FIGS. 12 and 13 the straps (e.g., 196 and 198 in FIG. 11) of the wearable electronic device 192 are not shown. Nevertheless, the security apparatus 102 in these FIGS. can also be used to secure the wearable electronic device 192 if the wearable included such straps.

In FIGS. 12 and 13, a side of the brace 112 includes an opening 113 for a charging cable 173 that plugs into or otherwise extends from the charger 172. Further, the collar 162 includes an opening 163 that enables the charging cable 173 to be fed through the neck 152 (between one of the neck portions 154 and an interior wall of the collar 162) and be passed through the opening 168 in the baseplate of the collar 162 and through a corresponding opening in a tabletop of a display table or in another display surface. A similar opening 113 can be added to the braces 112 shown in FIGS. 1-11, and a similar opening 163 can be added to the collars 162 shown in FIGS. 1-11.

As best seen in FIG. 13, each of the brace elements 114a, 114b of the braces 112, shown in FIGS. 13 and 14, includes only a single hook 146, rather than the first and second hooks 130 and 140, as was the case in the embodiments of FIGS. 8A-8C. As best seen in FIGS. 13E and 13F, each hook 146 includes a downwardly projecting post 148 extending downward from a side of the base 116 that is opposite the side opening 126. Further, an outward projecting lip 150 extends outward from the post 148 in a direction towards the side opening 126. The downward projecting post 148 and the outward projecting lip 150 collectively provide the hook 146. As best seen in FIG. 12A, a cut-out near an inner edge of the shelf portion 106a and an adjacent upper portion of the neck portion 154a provides a hook opening 109a. Similarly, a cut-out near an inner edge of the shelf portion 106b and an adjacent upper portion of the neck portion 154b provides a hook opening 109b. The openings 109a, 109b are used to secure the brace elements 114a, 114b respectively to the shelf support portions 106a, 106b, and thereby respectively to the neck portions 154a, 154b. In accordance with certain embodiments, each of the opening 109a and 109b is equal width to each of the hooks 146, so as to prevent lateral movement. As best seen in FIGS. 13C and 13E, in accordance with certain embodiments tabs 121 and 122 that extend inwardly from the sidewalls 118 of the brace elements 114a, 114b are structural to lock the brace elements to one another and prevent separation when pried against. Additionally, the tabs 121, 122 serve to break up and reduce the surface area and length of seams into which a potential thief may try to insert a tool, such as a screwdriver, to attempt to pry apart the brace elements 114a, 114b in order to try to steal the wearable device being secured by the security apparatus 102. Accordingly, the tabs 121, 122 help make the security apparatus 102 even more secure.

Referring to FIG. 12A and FIG. 13E, while the neck portions 154a, 154b are separated from one another: the hook 146 of the brace element 114a can be slid at an angle into the opening 109a so that a portion of the lip 150 rests under the shelf portion 106a; and the hook 146 of the brace element 114b can be slid at an angle into the opening 109b so that a portion of the lip 150 rests under the shelf portion 106b. In this manner, the brace element 114a can be selectively attached to the neck portion 154a, and the brace element 114b can be selectively attached to the neck portion 154b. At this point in time, a charger (e.g., 172) and a housing of a wearable (e.g., 192) can be sandwiched between the brace elements 114a, 114b as the first and second neck portions 115a, 115b are moved towards one another such that the bolts 181 (extending from the neck portion 154a) are inserted through the through-holes (within the neck portion 154b). At that point, the neck portions 154a, 154b are attached to one another using nuts (e.g., wing-nuts, not shown), or some other type of fasteners (besides nuts and bolts). Thereafter, the collar 162 is slid over the peripheries of the first and second neck portions 154a, 154b, thereby encasing the neck portions 154a, 154b and the fasteners that are securing the neck portions 154a, 154b to one another. At this point, the housing of the wearable (e.g., 192) cannot be removed from the brace so long as the first and second neck portions 154a, 154b continued to be attached to another. Further, at this point the bolts 190 or other fastener(s) extending downward from the neck 152 of the security apparatus 102 can be inserted into respective opening(s) in a tabletop of a display table or in some other display surface. In accordance with certain embodiments, a combined width of the first and second neck portions 154a, 154b, once they are secured to one another, is equal to (minus some tolerance) the inner width of the collar 162, to that the secured together neck portions 154a, 154b fit snuggly within the collar 162, so as to further secure the neck portions 154a, 154b to one another while they are covered with the collar 162.

FIG. 14A is a perspective view of seven further different versions of the brace 112 of the security apparatus 102. FIG. 14B is a slightly angled front view of the versions of the brace 112 shown in FIG. 14A, and FIG. 14C is a top view of the versions of the brace 112 shown in FIGS. 14A and 14B. As noted above, the specific size and shape of the brace 112, and the brace elements 114a, 114b thereof, can be customized for a specific wearable (e.g., smart watch and/or fitness tracker). This is because the case or housing of different wearables (e.g., different smart watches and/or fitness trackers) may have different shapes and sizes, such as, but not limited to, a square shape, a rectangular shape, or a circular shape. Further, the dimensions (e.g., length, width, and/or diameter) of the case or housing can be different for different wearables. Additionally, the locations, number, and sizes of the button openings 124 within each of the braces 112 can be customized for specific wearables. FIGS. 14A-14C can be referred to collectively herein as FIG. 14. Further, the form-factors of a charger 172 can vary for different wearables.

In the above described embodiments, after the first and second brace elements 114a, 114b of a brace 112 have been attached to the first and second shelf portions 106a, 106b of a support shelf 104, and the first and second neck portions 152a, 152b have been attached to one another (e.g., using wing nuts and bolts 181) while at least a portion of a housing of a wearable device (e.g., 192) is encased within the brace 112, the housing of the wearable device cannot be removed from the brace 112 so long as the first and second neck portion 152a, 152b continue to be attached to another. Each brace 112 can also be configured to encase at least a portion of a charger (e.g., 172) that is adjacent to an underside of the wearable device (e.g., 192), thereby enabling the charger to be used to charge the wearable device while the wearable device is secured to a tabletop of a display table or to another display surface by the security apparatus 102.

Examples of different types of wearables with which the security apparatus 102 can be used, and for which different sized and shaped braces 112 and chargers 172 may be designed, include various different models of the APPLE WATCH™ (made by Apple Inc., headquartered in Cupertino, Calif.), various different models of the Fitbit™ (made by Fitbit, Inc. headquartered in San Francisco, Calif.), as well as various different models of smart watches and/or fitness trackers made by Samsung Electronics Co., Ltd. (headquartered in Suwon, South Korea), Garmin Ltd. (headquartered in Olathe, Kansa), Fossil Group, Inc. (headquartered in Richardson, Tex.), just to name a few. While certain elements of the security apparatus 102 may be customized for use with certain models of wearables, as was just explained above, other elements of the security apparatus 102, such as the neck portions 154 and the collar 162, can be used with numerous different models of wearables.

Various elements of the security apparatus 102, including, but not limited to, the brace elements 114, the shelf portions 106, the neck portions 154, and the collar 162, are preferably made of a strong metal or metal alloy so that the security apparatus 102 is sturdy and cannot be readily bent, cut through, or otherwise broken or tempered with. For example, such elements can be made of steel. Different elements of the security apparatus 102 can be made of the same metal or different metals than other elements. All are subsets of such elements can be painted, powder coated, or otherwise covered to have any desired color and appearance. Certain elements, such as the brace elements 114 shown in FIG. 10, can be cast, molded, and/or machined. Other elements, such as the shelf portions 106, can be cut or stamped from a sheet of metal or alloy. Blanks for elements such as the neck portions 154, but not limited thereto, can be cut or stamped from a sheet of metal or alloy and then bent into their final shapes. Such cutting can be performed by laser cutting, mechanical cutting, or milling, but is not limited thereto. The various through-holes (e.g., 183) can be drilled (e.g., by a drill press) or otherwise made (e.g., using a laser) in blanks before they are bent, or after they are bent, and may even be drilled or otherwise made before the blanks are cut or stamped from one or more sheet(s) of metal or alloy. Various pieces of metal or alloy, after being cut into desired patterns, can be welded to one another using brazing, soldering, arc welding, or the like, to fixedly attach elements to one another. For an example, the brace elements 114 of the braces 112 shown in FIG. 14 can be made from two or more blanks that are cut according to patterns, appropriately bent using a bending machine, and then welded to another.

The security apparatuses of the embodiments of the present technology can be used to secure wearable devices to other display surfaces besides a horizontal display table. For example, such apparatuses can also be used to secure portable electronic devices to vertical display wall, if desired, or more generally, to any one of various different types of display surfaces or different types of display fixtures.

Beneficially, in the embodiments shown, the various components of the security apparatuses 102 described herein, such as the first and second neck portions 154a, 154b, the collar 162, and first and second brace portions 114a, 114b, can be attached to one another, and to a tabletop of a display table or to some other display surface, without the need for any handheld or other tools at all. Further, in specific embodiments, any and all nuts that are rotatably fastenable to respective bolts (e.g., 181, 190) are configured to be rotatable using only a person's fingers, e.g., by implementing the nuts using wingnuts (e.g., 182 or 192), or using nuts having an outer circumferential surface that is textured for easy rotation using a person's fingers, and/or using any other hand rotatable type of nuts. Benefits of the security apparatuses 102 being capable of being utilized to secure a wearable without the need for any handheld tools are that costs associated with such tools are eliminated, and there is no concern of needing to store tools or of losing and needing to replace such tools. Further, the security apparatuses 102 disclosed herein are very intuitive to assemble, and thus, require minimal instructions be provided to customers, such as retail stores that sell wearables.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The disclosure has been described in conjunction with various embodiments. However, other variations and modifications to the disclosed embodiments can be understood and effected from a study of the drawings, the disclosure, and the appended claims, and such variations and modifications are to be interpreted as being encompassed by the appended claims. In the claims, the word "comprising" does not exclude other elements or steps, and the indefinite article "a" or "an" does not exclude a plurality.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element.

For purposes of this document, without additional context, use of numerical terms such as a "first" object, a "second" object, and a "third" object may not imply an ordering of objects, but may instead be used for identification purposes to identify different objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope be defined by the claims appended hereto. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A security apparatus adapted to selectively secure a wearable device to a tabletop of a display table or to another display surface, the security apparatus comprising:
   a neck including first and second neck portions configured to be selectively attached to and detached from one another;
   a support shelf including first and second shelf portions, the first shelf portion fixedly attached to an upper end of the first neck portion, and the second shelf portion fixedly attached to an upper end of the second neck portion;
a brace including first and second brace elements, the first brace element configured to be selectively attached to the first shelf portion while the first and second neck portions are detached from one another, and the second brace element configured to be selectively attached to the second shelf portion while the first and second neck portions are detached from one another;
the brace configured to encase at least a portion of a housing of a wearable device to thereby secure the wearable device to the support shelf, while the first and second brace elements are attached to the first and second shelf portions, respectively, and the first and second neck portions of the neck are attached to one another;
one or more fasteners configured to selectively attach the first and second neck portions to one another;
a collar configured to be slid over and encase peripheries of the first and second neck portions while the first and second neck portions are attached to one another by the one or more fasteners, thereby covering the first and second neck portions and the one or more fasteners; and
one or more further fasteners extending from and/or attached to a lower end of at least one of the neck portions, the one or more further fasteners configured to be used to secure the security apparatus to a tabletop of a display table or another display surface.

2. The apparatus of claim 1, wherein:
after the first and second brace elements of the brace have been attached to the first and second shelf portions of the support shelf, and the first and second neck portions have been attached to one another while at least a portion of a housing of a wearable device is encased within the brace, the housing of the wearable device cannot be removed from the brace so long as the first and second neck portion continue to be attached to another.

3. The apparatus of claim 1, wherein:
after the collar has been slid over the first and second neck portions that have been attached to one another, the first and second neck portions cannot be removed from one another so long as the collar continues to cover the first and second neck portions; and
after the first and second brace elements of the brace have been attached respectively to the first and second shelf portions of the support shelf, and the first and second neck portions have been attached to one another while at least a portion of a housing of a wearable device is encased within the brace, the housing of the wearable device cannot be removed from the brace so long as the first and second neck portions continue to be attached to another, and thus, so long as the collar continues to cover the first and second neck portions.

4. The apparatus of claim 1, wherein:
the brace is also configured to encase at least a portion of a charger that is adjacent to an underside of the wearable device, thereby enabling the charger to be used to charge the wearable device while the wearable device is secured to a tabletop of a display table or to another display surface by the security apparatus.

5. The apparatus of claim 1, wherein:
each of the first and second brace elements includes a respective side opening that allows straps extending from opposing sides of a housing of a wearable device to extend through the side openings while the first and second brace elements encase at least a portion of the housing of the wearable device.

6. The apparatus of claim 5, wherein:
at least one of the first and second brace elements of the brace also include one or more button openings that allow one or more buttons on a housing of a wearable device to be accessed by a person while at least a portion of the housing of the wearable device is encased by the brace.

7. The apparatus of claim 1, wherein:
the neck holds the support shelf, and any wearable device whose housing is at least partially encased by the brace that is attached to the support shelf, at a distance above a tabletop of a display table or other display surface.

8. A security apparatus adapted to selectively secure a wearable device to a tabletop of a display table or to another display surface, the security apparatus comprising:
a neck including first and second neck portions configured to be selectively attached to and detached from one another;
a support shelf including first and second shelf portions, the first shelf portion fixedly attached to an upper end of the first neck portion, and the second shelf portion fixedly attached to an upper end of the second neck portion; and
a brace including first and second brace elements, the first brace element configured to be selectively attached to the first shelf portion while the first and second neck portions are detached from one another, and the second brace element configured to be selectively attached to the second shelf portion while the first and second neck portions are detached from one another;
wherein the brace is configured to encase at least a portion of a housing of a wearable device to thereby secure the wearable device to the support shelf, while the first and second brace elements are attached to the first and second shelf portions, respectively, and the first and second neck portions of the neck are attached to one another;
wherein each of the first and second shelf portions includes one or more respective openings;
wherein each of the first and second brace elements includes one or more respective hooks extending from an underside thereof;
wherein the one or more respective hooks of the first brace element is/are configured to be inserted into the one or more respective openings in the first shelf portion; and
wherein the one or more respective hooks of the second brace element is/are configured to be inserted into the one or more respective openings in the second shelf portion.

9. The apparatus of claim 8, wherein:
each of the first and second neck portions includes an upper neck opening proximate to where the first and second shelf portions are attached, respectively, to the first and second neck portions.

10. A security apparatus adapted to selectively secure a wearable device to a tabletop of a display table or to another display surface, the security apparatus comprising:
a neck including first and second neck portions configured to be selectively attached to and detached from one another;
a support shelf attached to an upper end of the neck, the support shelf including first and second shelf portions, the first shelf portion fixedly attached to an upper end of the first neck portion, and the second shelf portion fixedly attached to an upper end of the second neck portion;

a brace including first and second brace elements that are selectively attachable to the support shelf and are configured to encase at least a portion of a housing of a wearable device and secure the wearable device to the support shelf; and a collar configured to be slid over and encase peripheries of the first and second neck portions while the first and second neck portions are attached to one another;

wherein the neck holds the support shelf, and any wearable device whose housing is at least partially encased by the brace that is attached to the support shelf, at a distance above a tabletop of a display table or other display surface; and wherein after the first and second brace elements of the brace have been attached to the support shelf, the first and second neck portions have been attached to one another while at least a portion of a housing of a wearable device is encased within the brace, and the collar has been slid over the first and second neck portions that have been attached to one another, the first and second neck portions cannot be removed from one another so long as the collar continues to cover the first and second neck portions.

11. The apparatus of claim 10, wherein:

the first brace element is configured to be selectively attached to the first shelf portion while the first and second neck portions are detached from one another; and the second brace element is configured to be selectively attached to the second shelf portion while the first and second neck portions are detached from one another.

12. The apparatus of claim 10, further comprising:

one or more further fasteners extending from and/or attached to a lower end of at least one of the neck portions, the one or more further fasteners configured to be used to secure the security apparatus to a tabletop of a display table or another display surface.

13. The apparatus of claim 12, wherein:

after the first and second brace elements of the brace have been attached respectively to the first and second shelf portions of the support shelf, and the first and second neck portions have been attached to one another while at least a portion of a housing of a wearable device is encased within the brace, the housing of the wearable device cannot be removed from the brace so long as the collar continues to cover the first and second neck portions.

14. The apparatus of claim 10, further comprising:

a charger configured to wirelessly charge the wearable device using electromagnetic, inductive or radio frequency (RF) charging;

wherein the brace is also configured to encase at least a portion of the charger that is adjacent to the wearable device, thereby enabling the charger to be used to charge the wearable device while the wearable device is secured to a tabletop of a display table or to another display surface by the security apparatus.

15. A security apparatus adapted to selectively secure a wearable device to a tabletop of a display table or to another display surface, the security apparatus comprising:

first and second neck portions configured to be selectively attached to and detached from one another;

first and second shelf portions, the first shelf portion fixedly attached to an upper end of the first neck portion, and the second shelf portion fixedly attached to an upper end of the second neck portion;

first and second brace elements, the first brace element configured to be selectively attached to the first shelf portion while the first and second neck portions are detached from one another, and the second brace element configured to be selectively attached to the second shelf portion while the first and second neck portions are detached from one another;

the first and second brace elements configured to encase at least a portion of a housing of a wearable device to thereby secure the wearable device to the first and second shelf portion, while the first and second brace elements are attached to the first and second shelf portions, respectively, and the first and second neck portions are attached to one another; and a collar configured to be slid over and encase peripheries of the first and second neck portions while the first and second neck portions are attached to one another;

wherein after the collar has been slid over the first and second neck portions that have been attached to one another, the first and second neck portions cannot be removed from one another so long as the collar continues to cover the first and second neck portions; and wherein after the first and second brace elements of the brace have been attached respectively to the first and second shelf portions, and the first and second neck portions have been attached to one another while at least a portion of a housing of a wearable device is encased within the brace, a housing of a wearable device cannot be removed from the brace so long as the collar continues to cover the first and second neck portions.

16. The apparatus of claim 15, wherein:

each of the first and second brace elements includes a respective side opening that allows straps extending from opposing sides of a housing of a wearable device to extend through the side openings while the first and second brace elements encase at least a portion of the housing of the wearable device.

17. The apparatus of claim 16, further comprising:

one or more further fasteners extending from and/or attached to a lower end of at least one of the neck portions, the one or more further fasteners configured to be used to secure the security apparatus to a tabletop of a display table or another display surface.

18. The apparatus of claim 17, wherein:

the first and second neck portions hold any wearable device whose housing is at least partially encased by the first and second brace elements, at a distance above a tabletop of a display table or other display surface.

* * * * *